US012639386B2

(12) United States Patent
Mishra et al.

(10) Patent No.: US 12,639,386 B2
(45) Date of Patent: May 26, 2026

(54) SYSTEM AND METHOD FOR PERSONALIZED BROWSING USING A REMOTE DEVICE ON AN ELECTRONIC DEVICE

(71) Applicant: SAMSUNG ELECTRONICS CO., LTD., Suwon-si (KR)

(72) Inventors: Vinod Kumar Mishra, Noida (IN); Ashish Kumar Tanwar, Noida (IN); Mohammad Azam, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 18/381,519

(22) Filed: Oct. 18, 2023

(65) Prior Publication Data

US 2024/0045916 A1 Feb. 8, 2024

Related U.S. Application Data

(63) Continuation of application No. PCT/KR2022/007336, filed on May 24, 2022.

(30) Foreign Application Priority Data

May 24, 2021 (IN) .............................. 202111023001
May 18, 2022 (IN) .............................. 202111023001

(51) Int. Cl.
*G06F 16/00* (2019.01)
*G06F 16/9535* (2019.01)
(Continued)

(52) U.S. Cl.
CPC ........ *G06F 16/954* (2019.01); *G06F 16/9535* (2019.01); *G06F 16/9577* (2019.01); *G06F 40/143* (2020.01); *G06F 40/205* (2020.01)

(58) Field of Classification Search
CPC ............... G06F 16/954; G06F 16/9535; G06F 16/9577; G06F 40/143; G06F 40/205
See application file for complete search history.

(56) References Cited

U.S. PATENT DOCUMENTS

| | | | |
|---|---|---|---|
| 7,216,155 B2 * | 5/2007 | Stuckman | ........ H04N 21/26258 |
| | | | 709/219 |
| 7,899,806 B2 | 3/2011 | Aravamudan et al. | |

(Continued)

FOREIGN PATENT DOCUMENTS

| | | |
|---|---|---|
| EP | 3 547 096 A1 | 10/2019 |
| WO | 2017/115387 A1 | 7/2017 |
| WO | 2020/145522 A1 | 7/2020 |

OTHER PUBLICATIONS

Han, "Homepage Live: Automatic Block Tracing for Web Personalization", WWW 2007 / Track: Browsers and User Interfaces, May 8-12, 2007, 10 pages.*

(Continued)

*Primary Examiner* — Adam M Queler
*Assistant Examiner* — David Faber
(74) *Attorney, Agent, or Firm* — Sughrue Mion, PLLC

(57) ABSTRACT

A system and method are provided for personalized browsing using a remote device on an electronic device. A page associated with at least one user is display and one or more navigable elements on the displayed page are identified. One or more categories of the one or more navigable elements are created and the one or more navigable elements are classified based on at least one category of the one or more categories. Hybrid blocks are generated based on a category of the one or more navigable elements and user profile data and a content similarity check between the hybrid blocks is performed. A relevance matrix is created based on predefined context parameters and the content similarity check.

(Continued)

An element of interest is navigated to based on the relevance matrix and the hybrid block.

13 Claims, 25 Drawing Sheets

(51) Int. Cl.

| | |
|---|---|
| *G06F 16/954* | (2019.01) |
| *G06F 16/957* | (2019.01) |
| *G06F 40/143* | (2020.01) |
| *G06F 40/205* | (2020.01) |

(56) References Cited

U.S. PATENT DOCUMENTS

| | | | |
|---|---|---|---|
| 8,245,125 B1 | 8/2012 | Pupius et al. | |
| 8,392,470 B2 | 3/2013 | Han et al. | |
| 8,539,339 B2 | 9/2013 | Lloyd et al. | |
| 8,984,395 B2* | 3/2015 | Hedbor | G06F 16/9577 |
| | | | 715/234 |
| 9,477,713 B2 | 10/2016 | Alvino et al. | |
| 9,936,240 B2 | 4/2018 | Perez | |
| 10,061,860 B2 | 8/2018 | Daly, Jr. et al. | |
| 10,845,953 B1 | 11/2020 | Karppanen | |
| 11,036,813 B2 | 6/2021 | Rabili et al. | |
| 2004/0100509 A1 | 5/2004 | Sommerer et al. | |
| 2006/0041549 A1* | 2/2006 | Gundersen | G06F 16/951 |
| | | | 707/999.005 |
| 2007/0266406 A1 | 11/2007 | Aravamudan et al. | |
| 2008/0281834 A1* | 11/2008 | Wu | G06F 16/95 |
| 2009/0043739 A1 | 2/2009 | Choi | |
| 2009/0287989 A1* | 11/2009 | Chakra | G06F 16/9535 |
| | | | 715/205 |
| 2009/0319555 A1* | 12/2009 | Ragno | G06F 16/93 |
| | | | 707/999.005 |
| 2010/0023881 A1* | 1/2010 | Jania | G06F 16/958 |
| | | | 715/760 |
| 2012/0198026 A1* | 8/2012 | Roy | G06F 3/0482 |
| | | | 709/217 |
| 2012/0240063 A1* | 9/2012 | Andrade | G06F 16/9577 |
| | | | 715/760 |
| 2012/0311481 A1* | 12/2012 | Reyna | H04N 21/454 |
| | | | 715/781 |
| 2014/0089772 A1* | 3/2014 | Shetty | G06F 16/958 |
| | | | 715/206 |
| 2014/0337714 A1* | 11/2014 | Mu | H04L 67/535 |
| | | | 715/234 |
| 2014/0337716 A1 | 11/2014 | Priyadarshan et al. | |
| 2016/0086219 A1* | 3/2016 | Richardson | G06F 3/0485 |
| | | | 707/728 |
| 2017/0140063 A1* | 5/2017 | Dey | G06F 16/957 |
| 2018/0047062 A1 | 2/2018 | Kang et al. | |
| 2021/0081222 A1* | 3/2021 | Cummins | G06F 3/0488 |
| 2021/0334321 A1* | 10/2021 | Kim | G06F 16/285 |
| 2023/0385526 A1* | 11/2023 | Sahagun | G06F 16/958 |

OTHER PUBLICATIONS

International Search Report (PCT/ISA/210) issued Sep. 16, 2022 by the International Searching Authority in International Patent Application No. PCT/KR2022/007336, 3 pages.

Written Opinion (PCT/ISA/237) issued Sep. 16, 2022 by the International Searching Authority in International Patent Application No. PCT/KR2022/007336, 4 pages.

Communication dated Mar. 1, 2024, issued by Intellectual Property India in Indian Application No. 202111023001, 6 pages.

* cited by examiner

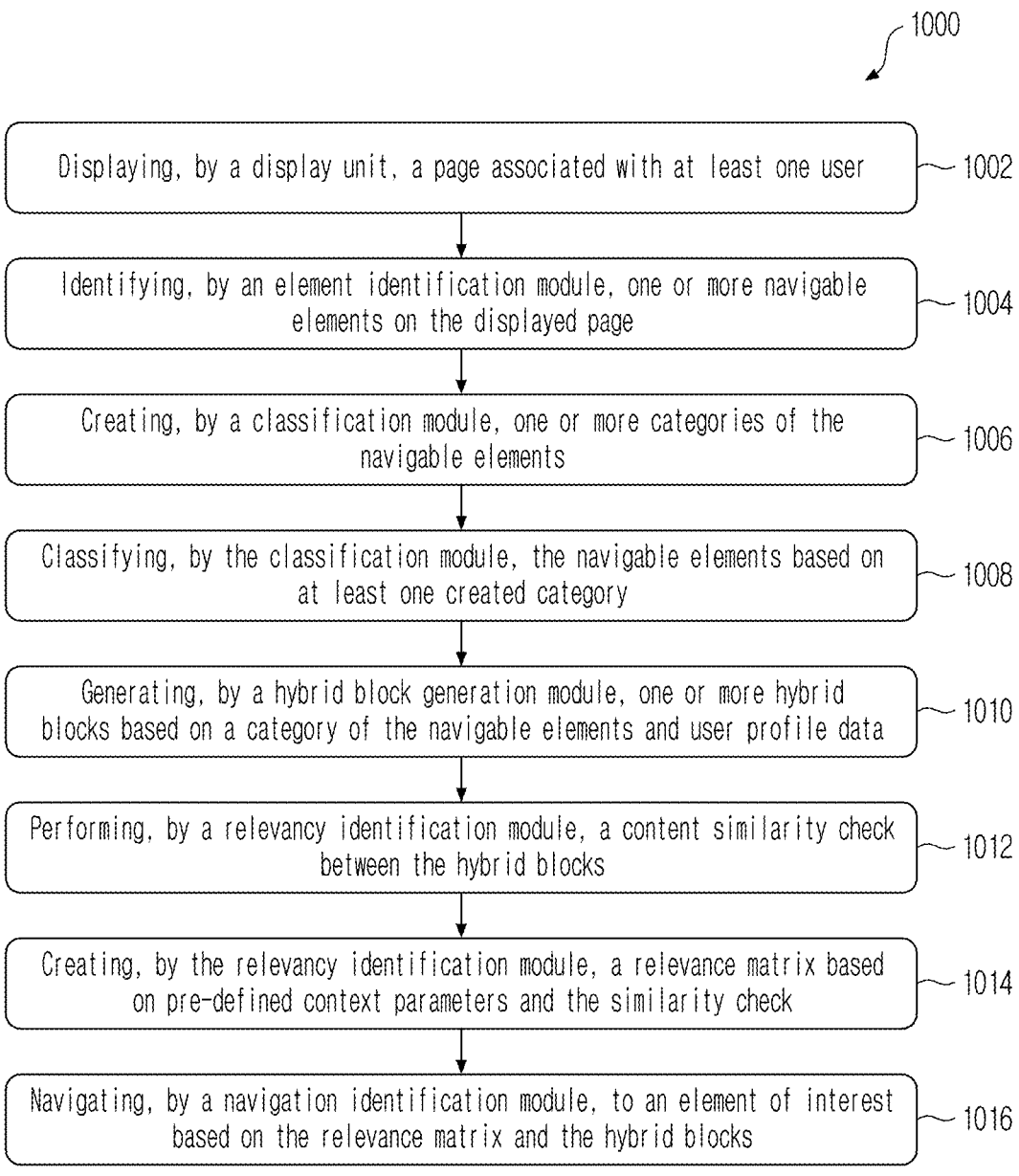

1000

Displaying, by a display unit, a page associated with at least one user ~ 1002

Identifying, by an element identification module, one or more navigable elements on the displayed page ~ 1004

Creating, by a classification module, one or more categories of the navigable elements ~ 1006

Classifying, by the classification module, the navigable elements based on at least one created category ~ 1008

Generating, by a hybrid block generation module, one or more hybrid blocks based on a category of the navigable elements and user profile data ~ 1010

Performing, by a relevancy identification module, a content similarity check between the hybrid blocks ~ 1012

Creating, by the relevancy identification module, a relevance matrix based on pre-defined context parameters and the similarity check ~ 1014

Navigating, by a navigation identification module, to an element of interest based on the relevance matrix and the hybrid blocks ~ 1016

FIG. 18

SYSTEM AND METHOD FOR PERSONALIZED BROWSING USING A REMOTE DEVICE ON AN ELECTRONIC DEVICE

CROSS-REFERENCE TO RELATED APPLICATIONS

This application is a continuation application of International Application No. PCT/KR2022/007336, filed on May 24, 2022, which is based on and claims priority to Indian Patent Application Nos. 202111023001, filed on May 24, 2021, and 202111023001, filed on May 18, 2022, in the Indian Intellectual Property Office, the disclosures of which are incorporated by reference herein their entireties.

BACKGROUND

1. Field

The disclosure relates to a system for browsing or navigating within applications on an electronic device. More particularly, the disclosure relates to a system and method for personalized browsing using a remote device on an electronic device.

2. Description of Related Art

All modern electronic devices provide a browser for a user to do web surfing. The user provides a web page link or a uniform resource locator (URL) on an address bar of the browser. Most of the web applications develop their own navigation logic which internally uses a web engine or a browser in a user interface format. Once the webpage is loaded into the system, the system parses the web content and creates a document object model (DOM) tree. The system performs static parsing and a node injected via a script, i.e., dynamic content. Thereafter, the web engine applies a style to the DOM tree and creates a layout of the web page. This is called a layout tree which goes for display on a display screen. On the display screen, navigation performed based on a logic of the web page or a default logic of navigation takes place. In a scenario, the web page consumes keys to perform the navigation based on the webpage logic. However, in most of the cases, the web pages are dependent on a browser logic of navigation.

Navigation for the webpages is developed based on a touch control for the electronic devices (for example, a mobile phone), or based on a pointer for the devices (such as a desktop, a laptop, and the like). However, there is no clearly defined specification for navigation in the electronic devices that support a remote controller or a keyboard. There is a loosely defined specification called spatial navigation. To comply with the spatial navigation specification, the webpage/website developers have to develop the webpage based on the spatial navigation, but due to a low percentage of the electronic devices such as televisions, as compared to mobile phones, desktop computers, and laptop computers, rarely any websites of those electronic devices such as televisions follow this standard. Therefore, the problem remains with browsing of the websites on those electronic devices such as televisions. The user spends a lot of time and effort to browse the internet on those electronic devices such as televisions.

For example, in a scenario, where a user is reading a webpage and a mouse cursor is at top left and point. The user wants to click some link at right bottom x, y=20, 10.

Assuming, 20 pixel movement in direction of 1 click and a navigable element starts position at 780, 540, the user has to click 39 right clicks and 27 down keys press to reach the element and press enter key, i.e., total 66 keys press event to select a desired link. In another example, a scenario which describes a target link mode problem. In a scenario, a user may watch YouTube® and uses a link mode navigation. Then, the user needs to come to a target has 10 links away on right and 12 links down in direction of down. From the start, the user may want to come to target by performing 22 minimum click operations.

Many related art systems have been developed to overcome these problems. Some existing solutions which are used by these related art systems are described below.

Hardware Solution: This needs an additional cost e.g. a wireless mouse or a remote device with touch pad or a pointing device. This would cause extra cost and addition of extra devices in an already crowded world of electronic devices.

Software Solution:

a. Link Mode Navigation: This is one way of handling this problem, i.e., a cursor will jump on all navigable elements.

A benefit of the link mode navigation is that it will be able to identify all navigation elements and the cursor will jump to a nearest navigable element in a direction of key press, such as up, down, left, and right.

A drawback of the link mode navigation is that although the number of clicks are reduced when compared to a mouse pointer based solution, the number of clicks still remain very high for the user to move from one mode to another due to an increasing complexity of webpages and a number of small hyperlinks. Also, the link mode navigation does not allow selection of a text and navigation done by web page script.

The link mode navigation is not a good candidate by seeing a nature of behavior and usability and will also not allow any selection if the text is not a navigable element. Also, this system will not be able to handle the navigation done by a web page script.

b. Pixel-based Movement of Cursor: While doing pixel navigation on a key press, the mouse pointer is moved only by a fixed number of pixels per click. Navigation can be done only at a pixel level, but there is no support for a group of elements based navigation.

A benefit of the pixel-based movement of the cursor is that if movement per click is more than faster movement to destination. If movement per click is low, then the user will have to click many times to reach destination.

A drawback of the pixel-based movement of the cursor is that if movement per click is more, then it will skip many small navigable elements of the webpage.

c. JS based Navigation: A webpage or an application developer can consume the key and provide the custom navigation, but the developer has to always create a grid and place the element, as a result, it is less utilized except applications like Vimeo® and Prime Video®.

There is a limitation of these related art solutions is that there is no support for user-friendly key navigation. This process is very time consuming if some elements are missed. It takes too many key presses to move from one element to another element.

Therefore, there is a need for a system and method a which addresses the above-noted problems and provides for personalized easy browsing using a remote device.

SUMMARY

Provided are systems and methods for personalized browsing using a remote device on an electronic device are provided.

According to an aspect of the disclosure, a method for personalized browsing using a remote device, includes: displaying a page associated with at least one user; identifying one or more navigable elements on the displayed page; creating one or more categories of the one or more navigable elements; classifying the one or more navigable elements based on at least one category of the one or more categories; generating hybrid blocks based on a category of the one or more navigable elements and user profile data; performing a content similarity check between the hybrid blocks; creating a relevance matrix based on pre-defined context parameters and the content similarity check; and navigating to an element of interest based on the relevance matrix and the hybrid blocks.

The method may further include determining a similarity of content between the hybrid blocks.

The method may further include storing, in a database, the user profile data and the pre-defined context parameters.

The method may further include navigating to the element of interest based on the relevance matrix, the user profile data, and the similarity of the content of the hybrid blocks.

The method may further include classifying the one or more navigable elements by using an artificial intelligence (AI) technique and a pre-trained model.

The method may further include performing, using the pre-trained model, inferencing with the display.

The user profile data may include web access data having a period of time, a time slot, a duration, a type of day, a domain, a sub-domain, a category of a website, a user identification number, timed interest, and a user rule.

The pre-defined context parameters may include a content similarity, a user interest during a time of navigation, and a previously selected category by the at least one user.

The method may further include navigating to the element of interest based on the relevance matrix, the user profile data, and the similarity of the content of the hybrid blocks.

The navigating to the element of interest includes determining an absolute horizontal (x) position and a width of the element of interest, an absolute vertical (y) and a height position, a carousel effect, a z-index of the element of interest, and a median width and a median height of the one or more navigable elements.

The method may further include parsing the displayed page by using a document object model (DOM) for identifying the one or more navigable elements.

The method may further include generating at least one rule based on system constraints and a user configuration for navigating to the element of interest.

The method may further include receiving a user preference for navigation of the hybrid blocks; and determining a device capability for navigation.

The method may further include creating a plurality of direction navigation rules based on the system constraints and the user configuration, and deciding a direction navigation.

According to an aspect of the disclosure, a system for personalized browsing using a remote device, includes: a display configured to display a page associated with at least one user; and one or more processors operatively connected to the display, wherein the one or more processors includes: an element identification module configured to identify one or more navigable elements on the displayed page; a classification module configured to cooperate with the element identification module, create one or more categories of the one or more navigable elements, and classify the one or more navigable elements based on at least one category of the one or more categories; a hybrid block generation module configured to cooperate with the classification module, generate hybrid blocks based on a category of the one or more navigable elements and user profile data; a relevancy identification module configured to cooperate with the hybrid block generation module, perform a content similarity check between the hybrid blocks, and create a relevance matrix based on pre-defined context parameters and the content similarity check; and a navigation identification module configured to: cooperate with the relevancy identification module, and navigate to an element of interest based on the relevance matrix and the hybrid blocks.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a flow chart depicting a method for personalized browsing using a remote device, according to an embodiment of the disclosure;

FIG. 18 illustrates a use case scenario depicting key press of a remote device for navigation, according to an embodiment of the disclosure;

DETAILED DESCRIPTION

Figure 1:
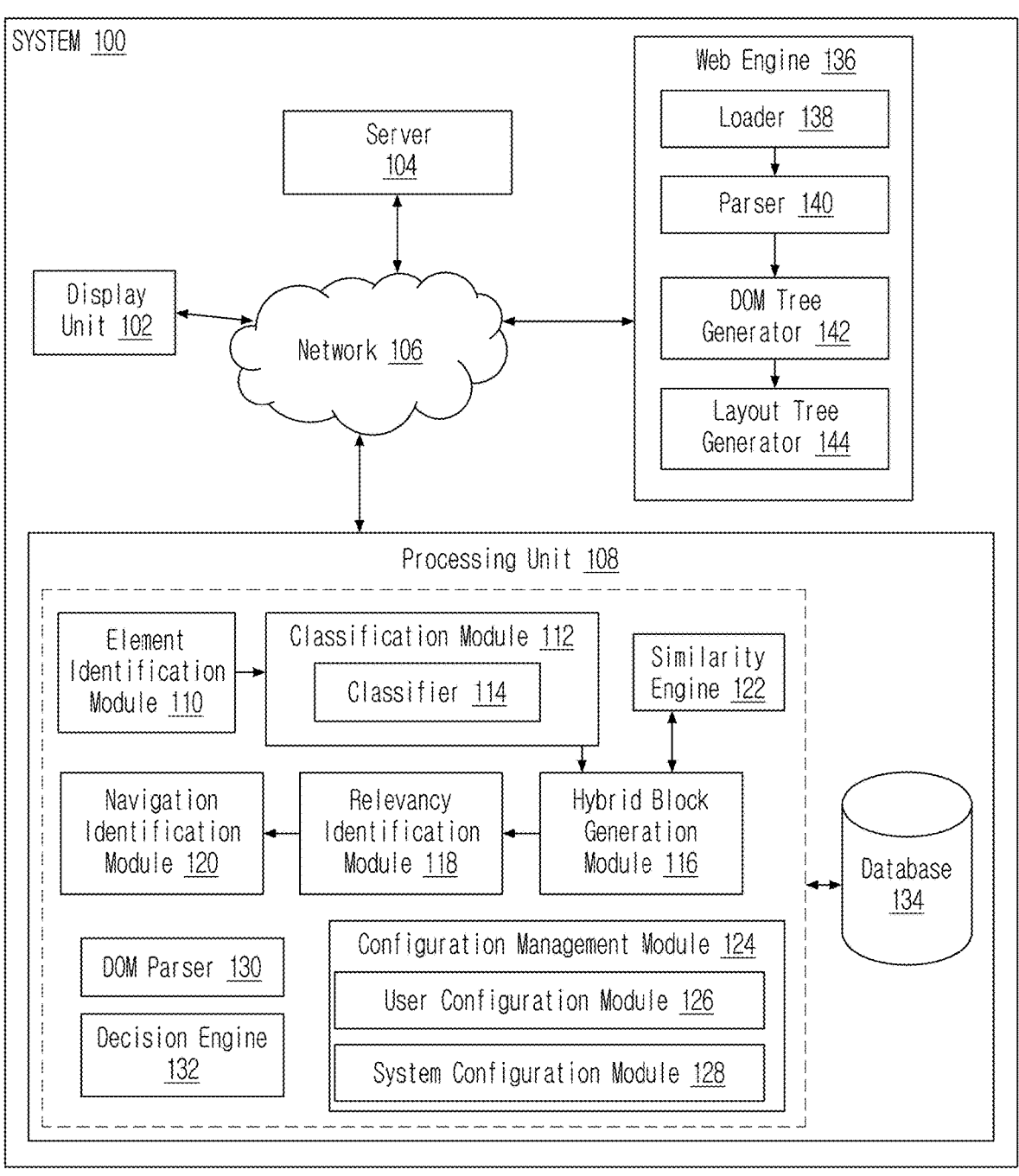
FIG. 1 is a block diagram depicting a system for personalized browsing using a remote device, according to an embodiment of the disclosure.

In the following description, for the purpose of explanation, specific details are set forth in order to provide an understanding of the disclosure. It will be apparent, however, to one skilled in the art that the disclosure may be practiced without these details. One skilled in the art will recognize that embodiments of the disclosure, some of which are described below, may be incorporated into a number of systems.

One or more embodiments of the disclosure provide a system and method for personalized browsing using a remote device on an electronic device.

The same numbers are used throughout the drawings to reference like features and modules.

It should be appreciated by those skilled in the art that any block diagrams herein represent conceptual views of illustrative systems embodying the principles of the disclosure. Similarly, it will be appreciated that any flowcharts, flow diagrams, and the like represent various processes which may be substantially represented in computer readable medium and so executed by a computer or processor, whether or not such computer or processor is explicitly shown.

Furthermore, connections between components and/or modules within the figures are not intended to be limited to direct connections. Rather, these components and modules may be modified, re-formatted or otherwise changed by intermediary components and modules.

References in the disclosure to "one embodiment" or "an embodiment" mean that a particular feature, structure, characteristic, or function described in connection with the embodiment is included in at least one embodiment of the disclosure. The appearances of the phrase "in one embodiment" in various places in the specification are not necessarily all referring to the same embodiment.

In an embodiment, at least one of the plurality of modules may be implemented through an Artificial Intelligence (AI) model. A function associated with AI may be performed through a non-volatile memory, a volatile memory, and the processor.

The processor may include one processor or a plurality of processors. In an embodiment, one processor or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one processor or the plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

In one of the embodiments, a method for personalized browsing using a remote device includes displaying, by a display unit, a page associated with at least one user. The method includes identifying, by an element identification module, one or more navigable elements on the displayed page. The method includes creating, by a classification module, one or more categories of the navigable elements. The method includes classifying, by the classification module, the navigable elements based on at least one created category. The method includes generating, by a hybrid block generation module, one or more hybrid blocks based on a category of the navigable elements and user profile data. The method includes performing, by a relevancy identification module, a content similarity check between the hybrid blocks. The method includes creating, by the relevancy identification module, a relevance matrix based on predefined context parameters and the similarity check. The method includes navigating, by a navigation identification module, to an element of interest based on the relevance matrix and the hybrid blocks.

In another embodiment, the method includes computing, by a similarity engine, similarity of content between the hybrid blocks.

In another embodiment, the method includes storing, in a database, the user profile data and the pre-defined context parameters.

In another embodiment, the method includes navigating, by the navigation identification module, to the element of interest based on the relevance matrix, the user profile data, and the computed similarity of the content of the hybrid blocks.

In another embodiment, the method includes the operation of classifying, by the classification module, the navigable elements by using an Artificial Intelligence (AI) technique and a pre-trained model.

In another embodiment, the method includes performing, by a classifier having the pre-trained model, inferencing with the display unit.

In another embodiment, the user profile data includes web access data having period of time, time slot, duration, a type of day, domain, sub-domain, category of the website, user identification number, timed interest, and user rule.

In another embodiment, the pre-defined context parameters include content similarity, user interest during the time of navigation, and previously selected category by the user.

In another embodiment, the method includes navigating, by the navigation identification module, to the element of interest based on the relevance matrix, the user profile data, and the computed similarity of the content of the hybrid blocks.

In another embodiment, the operation of navigating, by the navigation identification module, to the element of interest further includes computing an absolute horizontal (x) position and width of the element of interest, an absolute vertical (y) and height position, carousel effect, z-index of the element of interest, and median width and median height of the navigable elements.

In another embodiment, the method includes parsing, by a DOM parser, the displayed page using a document object model (DOM) for identifying the navigable elements.

In another embodiment, the method includes generating, by a configuration management module, at least one rule based on system constraints and user configuration for navigating to the element of interest.

In another embodiment, the method includes receiving, by a user configuration module, a user preference for navigation of the hybrid blocks. Further, the method includes determining, by a system configuration module, device capability for navigation.

In another embodiment, the method includes creating, by a decision engine, a plurality of direction navigation rules based on the system constraints and user configuration and take a decision of a direction navigation.

In another embodiment, the method includes fetching, by a web engine, the displayed page from a server and executing the display page on the display unit.

In another embodiment, the method includes operations of loading, by a loader, the displayed page on the display unit; parsing, by a parser. the loaded page and extracting a plurality of elements; generating, by a DOM tree generator, a DOM tree based on the extracted elements; and generating, by a layout tree generator, a layout tree by applying pre-determined element properties at each DOM node of the DOM tree.

In another embodiment, the method includes extracting, by the DOM parser, the DOM nodes from the generated DOM tree, and parsing the DOM nodes based on a user configuration rule for generation of the navigation.

In another embodiment, a system for personalized browsing using a remote device includes a display unit and a processing unit. The display unit is configured to display a page associated with at least one user. The processing unit includes an element identification module, a classification module, a hybrid block generation module, a relevancy identification module, and a navigation identification module. The element identification module is configured to identify one or more navigable elements on the displayed page. The classification module is configured to create one or more categories of the navigable elements, and classify the navigable elements based on at least one created category. The hybrid block generation module is configured to generate one or more hybrid blocks based on a category of the navigable elements and user profile data. The relevancy identification module is configured to perform a content similarity check between the hybrid blocks, and create a relevance matrix based on pre-defined context parameters and the similarity check. The navigation identification module is configured to navigate to an element of interest based on the relevance matrix and the hybrid blocks.

In another embodiment, the processing unit comprises a similarity engine which is configured to compute similarity of content between the hybrid blocks.

In another embodiment, the processing unit comprises a database which is configured to store the user profile data and the pre-defined context parameters.

In another embodiment, the classification module is configured to classify the navigable elements by using an Artificial Intelligence (AI) technique and a pre-trained model.

In another embodiment, the classification module includes a classifier having the pre-trained model to perform inferencing with the display unit.

In another embodiment, the user profile data includes web access data having period of time, time slot, duration, a type of day, domain, sub-domain, category of the website, user identification number, timed interest, and user rule.

In another embodiment, the pre-defined context parameters include content similarity, user interest during the time of navigation, and previously selected category by the user.

In another embodiment, the navigation identification module is configured to navigate to the element of interest based on the relevance matrix, the user profile data, and the computed similarity of the content of the hybrid blocks.

In another embodiment, the navigation identification module is configured to navigate to the element of interest by computing an absolute horizontal (x) position and width of the element of interest, an absolute vertical (y) and height position, carousel effect, z-index of the element of interest, and median width and median height of the navigable elements.

In another embodiment, the processing unit includes a DOM parser which is configured to parse the displayed page using a DOM to identify the navigable elements by the element identification module.

In another embodiment, the processing unit includes a configuration management module which is configured to generate at least one rule based on system constraints and user configuration for navigating to the element of interest.

In another embodiment, the configuration management module includes a user configuration module and a system configuration module. The user configuration module is configured to receive a user preference for navigation of the hybrid blocks. The system configuration module is configured to determine device capability for navigation.

In another embodiment, the processing unit includes a decision engine having a decision tree, which is configured to create a plurality of direction navigation rules based on the system constraints and user configuration and take a decision of a direction navigation.

In another embodiment, the system includes a web engine. The web engine is configured to fetch the displayed page from a server and execute the displayed page on the display unit. The web engine further includes a loader, a parser, a DOM tree generator, and a layout tree generator. The loader is configured to load the displayed page on the display unit. The parser is configured to parse the loaded page and extract a plurality of elements. The DOM tree generator is configured to generate a DOM tree based on the extracted elements. The layout tree generator is configured to generate a layout tree by applying pre-determined element properties at each DOM node of the DOM tree.

In another embodiment, the DOM parser is configured to extract the DOM nodes from the generated DOM tree and parse the DOM nodes based on a user configuration rule to generate the navigation.

In an embodiment, the disclosure provides a system and a method for personalized easy browsing using the remote device on an electronic device. In one embodiment, the system is configured to provide easy browsing of Internet through the remote device or a keyboard on web pages by classifying and merging navigable elements into hybrid blocks using a decision engine and navigating the hybrid blocks by using a user profile, a similarity engine, and relevance matrix.

In an embodiment, the disclosure provides a system and method that identify all navigable elements of a web page, make logical grouping of elements for fast movement to an element of interest inside the website. This solution is hybrid, advanced, and a personalized version of link mode navigation and mouse navigation, instead of just selecting only anchor/href (hypertext reference). The logical grouping of the navigable element selects a larger area under which there can be a combination of multiple elements based on a user's preference and personalized based on the user's area of interest. In an embodiment, the user's area of interest can include, but is not limited to, sports, business, news, movies, and songs.

In an embodiment, the disclosure provides a system and method that provides a fast scrolling using a remote controller, where a pointer device may not always point to an element of interest and can overrun desired element location. It also provides link navigation, where many small hyperlinks take long time to navigate.

FIG. 1 illustrates a block diagram depicting a system 100 for personalized browsing using a remote device, according to an embodiment of the disclosure.

A system for personalized browsing using a remote device (hereinafter referred to as "system") 100 includes a display unit (or display) 102, a server 104, a network 106, a processing unit (one processor or a plurality of processors) 108, and a web engine 136.

In an embodiment, the system 100 is configured to provide easy browsing of Internet through a remote device on a display page shown on an electronic device. In an embodiment, the electronic device can be a television, a projector screen, or any other similar device. In an embodiment, each electronic device is associated with the remote device to perform the various functionalities on the electronic device. In an embodiment, the remote device can be a remote control unit, keyboard, or a mouse.

The electronic device includes the display unit 102 which is configured to display a page on the electronic device. In an embodiment, the displayed page is associated with a user.

In one embodiment, the user can open the page based on his interest. In an embodiment, the displayed page can be a web page.

In an embodiment, the server 104 may be configured to be communicatively coupled with the display unit 102, the processing unit 108, and the web engine 136 over the network 106. In an embodiment, the server 104 can be a web server which is configured to receive user's inputs and fetch at least one web page based on the received inputs, and then transmitted the display page/web page to the display unit 102. In one embodiment, the user may provide the inputs by using the remote device. In another embodiment, the network 106 includes wired and wireless networks. Examples of the wired networks include a Wide Area Network (WAN) or a Local Area Network (LAN), a client-server network, a peer-to-peer network, and so forth. Examples of the wireless networks include Wi-Fi, a Global System for Mobile communications (GSM) network, and a General Packet Radio Service (GPRS) network, an enhanced data GSM environment (EDGE) network, 802.5 communication networks, Code Division Multiple Access (CDMA) networks, or Bluetooth networks.

The processing unit 108 may be embodied by one processor or a plurality of processors, and include an element identification module 110, a classification module 112, a hybrid block generation module 116, a relevancy identification module 118, and a navigation identification module 120.

The element identification module 110 may be configured to identify one or more navigable elements on the displayed page of the display unit 102.

The classification module 112 may be configured to cooperate with the element identification module 110 to receive the identified navigable elements. The classification module 112 may be further configured to create one or more categories of the navigable elements, and classify the navigable elements based on at least one created category. In an embodiment, the classification module 112 may be configured to classify the navigable elements by using an Artificial Intelligence (AI) technique and a pre-trained model. In one embodiment, the classification module 112 may include a classifier 114 having the pre-trained model to perform inferencing with the display unit 102.

The hybrid block generation module 116 may be configured to cooperate with the classification module 112 to receive the categories and classified navigable elements. The hybrid block generation module 116 may be further configured to generate one or more hybrid blocks based on a category of the navigable elements and user profile data.

In an embodiment, the processing unit 108 may include a similarity engine 122 configured to cooperate with the hybrid block generation module 116. The similarity engine 122 is further configured to compute similarity of content between the hybrid blocks.

In another embodiment, the processing unit 108 may include a database 134, which is configured to store the user profile data and the pre-defined context parameters. In an embodiment, the user profile data can include user's personal details and user's area of interest. The user profile data may also include at least one of web access data having period of time, a time slot, a duration, a type of day, a domain, a sub-domain, a category of a website, a user identification number, timed interest, or a user rule. In one embodiment, the database 134 may be implemented as, but is not limited to, an enterprise database, a remote database, a local database, and the like. In one embodiment, the database 240 may themselves be located either within the vicinity of each other or may be located at different geographic locations. In another embodiment, the database 240 can be implemented as a single database.

The relevancy identification module 118 is configured to cooperate with the hybrid block generation module 116 to receive the generated hybrid blocks. The relevancy identification module 118 is further configured to perform a content similarity check between the hybrid blocks, and create a relevance matrix based on pre-defined context parameters and the similarity check. In an embodiment, the pre-defined context parameters include content similarity, user interest during the time of navigation, and previously selected category by the user.

The navigation identification module 120 is configured to cooperate with the relevancy identification module 118 to receive the created relevance matrix. The navigation identification module 120 is further configured to navigate to an element of interest based on the created relevance matrix and the hybrid blocks. In an embodiment, the navigation identification module 120 is configured to navigate to the element of interest based on the relevance matrix, the user profile data, and the computed similarity of the content of the hybrid blocks. In one embodiment, the navigation identification module 120 is configured to navigate to the element of interest by computing an absolute horizontal (x) position and width of the element of interest, an absolute vertical (y) and height position, carousel effect, z-index of the element of interest, and median width and median height of the navigable elements.

In an embodiment, the processing unit 108 further includes a configuration management module 124, a DOM parser 130, and a decision engine 132.

The configuration management module 124 is configured to generate at least one rule based on system constraints and user configuration for navigating to the element of interest. The configuration management module 124 further includes a user configuration module 126 and a system configuration module 128. The user configuration module 126 is configured to receive a user preference for navigation of the hybrid blocks. The system configuration module 128 is configured to determine device capability for navigation. In an embodiment, The DOM parser 130 is configured to parse the displayed page using a document object model (DOM) to identify the navigable elements by the element identification module 110.

The decision engine 132 is having a decision tree, which is configured to create a plurality of direction navigation rules based on the system constraints and user configuration and take a decision of a direction navigation.

The web engine 136 is configured to fetch the displayed page from the server 104 and execute the displayed page on the display unit 102. The web engine 136 includes a loader 138, a parser 140, a DOM tree generator 142, and a layout tree generator 144.

The loader 138 is configured to load the displayed page on the display unit 102.

The parser 140 is configured to cooperate with the loader 138 to receive the loaded displayed page. The parser 140 is further configured to parse the loaded page and extract a plurality of elements. In an embodiment, the extracted elements can be navigable elements, non-navigable elements, or combinations thereof.

The DOM tree generator 142 is configured to cooperate with the parser 140 to receive the extracted elements. The DOM tree generator 142 is configured to generate a DOM tree based on the extracted elements.

The layout tree generator 144 is configured to cooperate with the DOM tree generator 142 to receive the generated DOM tree. The layout tree generator is further configured to generate a layout tree by applying pre-determined element properties at each DOM node of the DOM tree.

In an embodiment, the DOM parser 130 of the processing unit 108 is configured to extract the DOM nodes from the generated DOM tree, and parse the DOM nodes based on a user configuration rule to generate the navigation.

Figure 2:
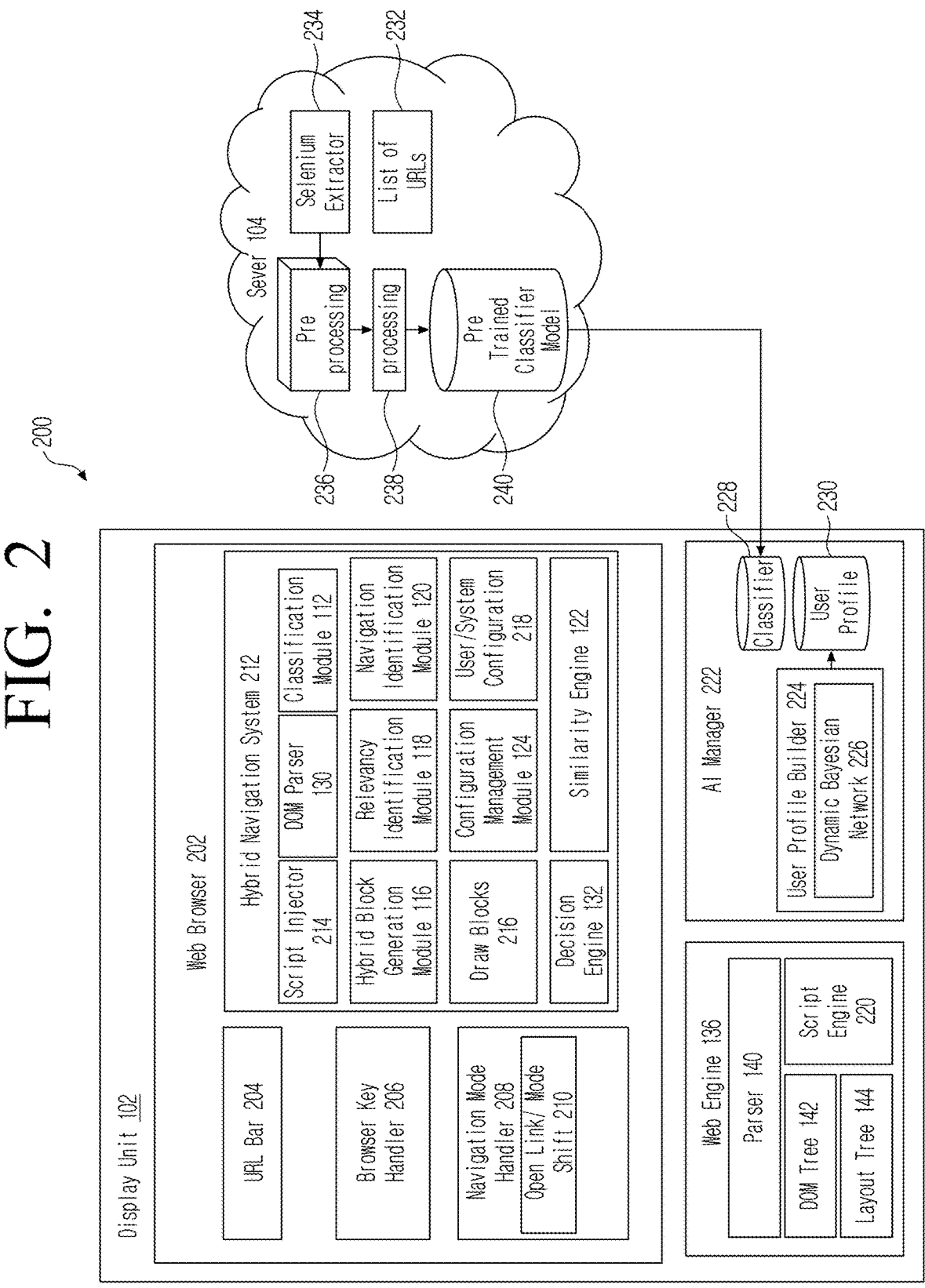
FIG. 2 is a block diagram depicting a system architecture, according to an embodiment of the disclosure.

FIG. 2 is a block diagram depicting a system architecture 200, according to an embodiment of the disclosure.

In FIG. 2, the architecture 200 includes the display unit 102 and the server 104. The display unit 102 includes a web browser 202, the web engine 136, and an artificial intelligence (AI) manager 222. The server 104 includes a list of URLs 232, a selenium extractor 234, a pre-processing operation 236, a classifier 238, a database having a pre-trained classifier model 240.

The web browser 202 consists of a user interface (UI) and other hidden modules which interact with the user. The web browser 202 includes a uniform resource locator (URL) bar 204, a browser key handler 206, a navigation mode handler 208, and a hybrid navigation system 212.

In an embodiment, in the URL bar 204, the user enters a web page URL or a search string for web search. The browser key handler 206 processes a key event given by the user. In an embodiment, the key event is performed by using the remote device key buttons. In an embodiment, the remote device includes different types of key buttons, such as up/down, right/left, numeric key buttons, home button, back button, ON/OFF button etc. In one embodiment, the browser key handler 206 is configured to handle the web browser based on a key type, and further pass it to the web engine 136 to pass it to the web page scripts via a script engine 220 of the web engine 136 or consume without performing any action.

The navigation mode handler 208 is configured to handle the hybrid navigation system 212. The navigation mode handler 208 is responsible for selecting a new hybrid block in a direction of a navigation key. The navigation mode handler 208 includes an open link/mode shift 210. By using the open link/mode shift 210, the user can open new web pages, or it can come in and out of a hybrid mode. In an embodiment, the open link shift 210 is configured to open a new web page based on a cursor position in the hybrid block and the mode shift 210 is configured to allow the user to start a hybrid navigation mode on the display unit 102 or exit the hybrid navigation mode.

In an embodiment, the hybrid navigation system 212 consisted of various sub-components which are defined in the system 100. In one embodiment, the system 100 can be the hybrid navigation system 212. The hybrid navigation system 212 is a backbone and its primary responsibility to get DOM data, parse the DOM data, classify the elements, and generate the hybrid blocks for hybrid navigation. On the navigation key press, the hybrid navigation system 212 is configured to select a right navigation block based on the user profile data and the user rule. The hybrid navigation system 212 includes a script injector 214, the DOM parser 130, the classification module 112, the hybrid block generation module 116, the relevancy identification module 118, the navigation identification module 120, draw blocks 216, the configuration management module 124, the user/system configuration 218, the decision engine 132, and the similarity engine 122.

The script injector 214 is configured to inject a script or a scripted method to the web engine 136 and get DOM data from the displayed page.

The DOM parser 130 is configured to parse the DOM and get the position of an element on the display unit 102. In an embodiment, the DOM parser 130 is configured to parse the displayed page using the DOM and identify the navigable elements by the element identification module 110.

The classification module 112 is configured to create one or more categories of the navigable elements and classify the navigable elements based in the created category. In an embodiment, the classification module 112 is configured to create the category of the DOM element by using a classifier 228 of the AI manager 222.

The hybrid block generation module 116 is configured to generate one or more hybrid blocks based on the category of the navigable elements and user profile data. In an embodiment, the hybrid block generation module 116 is configured to generate the hybrid blocks after getting the category of the elements and rules from the system or the user profile.

The relevancy identification module 118 is configured to perform a content similarity check between the hybrid blocks, and create the relevance matrix based on the predefined context parameters and the similarity check. In an embodiment, the relevancy identification module 118 is configured to create the relevance matrix of all the DOM elements based on the category, current selected node similarity of node from a current selected node. The relevancy identification module 118 helps to select next hybrid block in a direction of navigation.

The navigation identification module 120 is configured to navigate the element of interest based on the relevance matrix and the hybrid blocks. In an embodiment, the navigation identification module 120 provides a data structure of the hybrid blocks. The navigation identification module 120 contains a state of the hybrid blocks, relation between the hybrid blocks. For example, the navigation identification module 120 navigates to the element of interest based on the relevance matrix and the hybrid blocks. The navigation to the element of interest is as follows.

```
NavigationIdentifier(node){
    this.type = 'tree-node';
    this.node = null;
    this.children = [ ];
    this.el;
    this.tempEl;
    this.x;
    this.y;
    this.width;
    this.height;
    this.isCat = ...;
    this.isParent = ...;
    ....
    ....
}
```

The draw blocks 216 are configured to draw a highlighter boundary around the selected hybrid block and place the cursor at a place from where all the element in the hybrid blocks is at least number of clicks.

The configuration management module 124 is configured to generate at least one rule based on system constraints and user configuration for navigating to the element of interest. In an embodiment, the configuration management module 124 is configured to apply a best rule based on the system constraints and configuration and user given rules for navigation using the decision engine 132.

The user/system configuration 218 provide the rules for hybrid block navigation, for example, skip advertisements, go to latest in section, always go through sports or new headlines first, size of hybrid blocks, and the like. A default configuration is present in the system 100 based on the electronic device capability.

The decision engine 132 is configured to create the plurality of direction navigation rules based on the system constraints and user configuration and take a decision of the direction navigation. In an embodiment, the decision engine 132 is used by a navigation rule decision engine to identify the best rule to be used for hybrid navigation in a given context. The decision engine 132 is a tree based learning technique which provides a decision based on disjunction of conjunction of constraints. For example, $$Skip\ Ads(True) = (Rule = Skip\ ads)^\wedge(hybrid$$
$$block = ads)V(Rule = skip\ ads)^\wedge(hybrid$$
$$block = club\ ads\ with\ non\text{-}ads\ block)$$

The similarity engine 122 is configured to compute the similarity of content between the hybrid blocks. In an embodiment, the similarity engine 122 uses cosine similarity or equivalent to compute similarity of content based on the current hybrid block.

The web engine 136 is configured to fetch the displayed page from the server 104 and execute the displayed page on the display unit 102. In an embodiment, the web engine 136 is developed based on a World Wide Web Consortium (W3C) specification to handle the web page and the content of the web page. In an embodiment, there are four components which are used for hybrid navigation system 212, i.e., the parser 140, the DOM tree generator 142, the layout tree generator 144, and the script engine 220.

The parser 140 is configured to parse the web page and extract the plurality of elements. In an embodiment, the parser 140 is configured to parse the HyperText Markup Language (HTML) pages and resolve the dependency of other pages, for example, script, CSS, and the like.

Figure 4A:
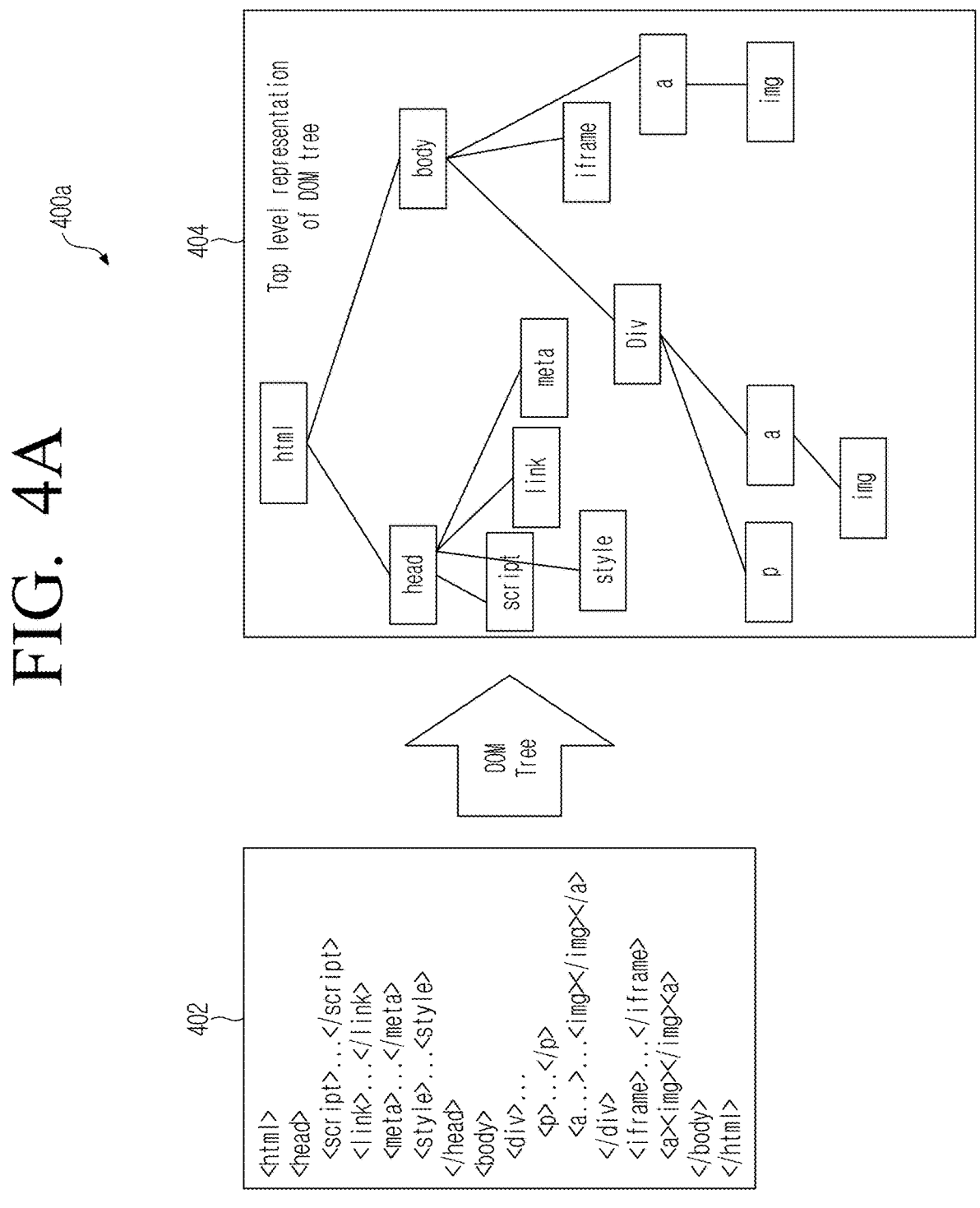
FIG. 4A is a graphical representation depicting a DOM tree, according to an embodiment of the disclosure.

The DOM tree generator 142 is configured to generate the DOM tree based on the extracted elements. In an embodiment, the DOM tree generator 142 is a backbone of the system 100. In this, all the content is represented in a form of a DOM tree and DOM element. The hybrid navigation system (HNS) uses the DOM to get the element and created navigable blocks from a body tag onwards. FIG. 4A is a graphical representation depicting a DOM tree, according to an embodiment of the disclosure. In FIG. 4A, a top level representation of the DOM tree 400a for the HTML page is shown. For example, there is a HTML page 402. The DOM tree generator 142 is configured to generate the DOM tree 400a for the HTML page 402. The DOM tree 404 includes a node, for example, root element <html>. The node root element <html> further includes objects. In an embodiment, each node is an object representing a part of the HTML page 402. The root element <html> has two child nodes, i.e., an element <head>, and an element <body>. The node element <head> is used to identify one or more identifiers in the HTML page 402. The identifiers include script, style, link, and meta. The node element <body> is used to identify one or more objects in the HTML page 402. The objects include Div, iFrame, a, img, and the like. The object Div further includes sub-objects include, but are not limited to, p, a, and img.

Figure 4B:
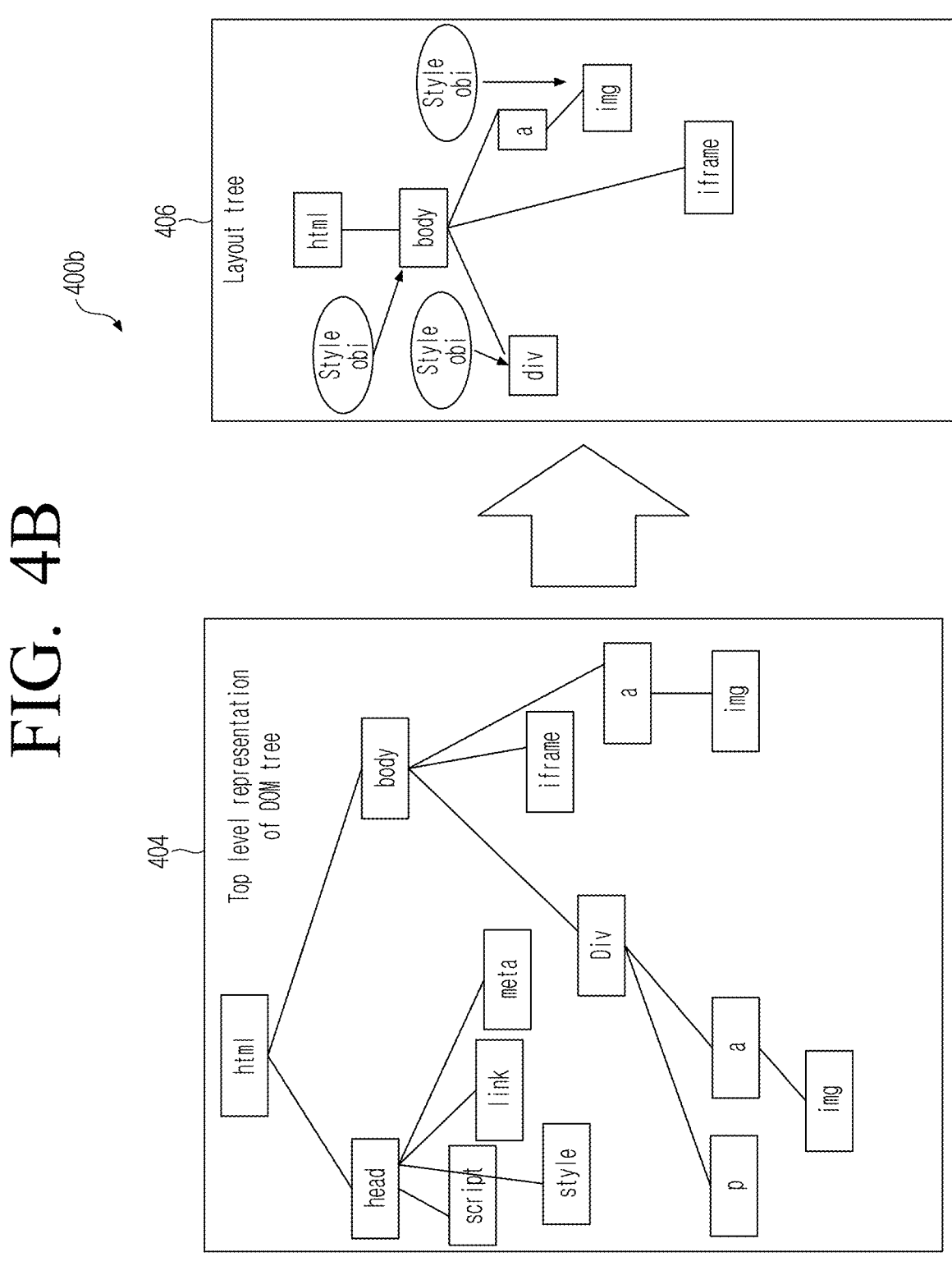
FIG. 4B is a graphical representation depicting a layout tree, according to an embodiment of the disclosure.

The layout tree generator 144 is configured to generate the layout tree 406 by applying pre-determined element properties at each DOM node of the DOM tree 404. In an embodiment, the layout tree 406 is generated after the DOM tree 404. The layout tree 406 consists of various trees, which draw the elements on the display unit 102. The layout tree 406 describes which element will come at which position on the display unit 102. In an embodiment, the layout tree may not be same as the DOM tree. The hybrid navigation system 212 uses the layout information of the web page and get a bounding rectangle of the DOM elements. FIG. 4B is a graphical representation depicting a layout tree 400*b*, according to an embodiment of the disclosure. The layout tree generator 144 is configured to generate the layout tree by using the generated DOM tree 404. The root element <html> has a child node, i.e., an element <body>. The node element <body> is used to identify one or more objects. The objects include Div, iFrame, a, img, and the like. In an embodiment, an element function can be applied on the objects, for example, an object "style obj" is applied on each node, i.e., body, Div, img, etc.

The script engine 220 is configured to execute JavaScript and its application programming interface (API).

The AI manager 222 is configured to classify the content and create the user profile. The AI manager 222 includes the classifier 228, i.e., a pre-trained model to do inferencing to content to classify the category and build the user profile using a dynamic Bayesian network 226. In an embodiment, the classifier 228 acts an inferencing module which includes a pertained model that classifies the content in a pre-defined category. A user profile builder 224 is configured to build the user profile using the dynamic Bayesian network 226. The user profile builder 224 consists of an interest of user best navigation rule based on the web page category. In one embodiment, the dynamic Bayesian network 226 is a lookup table and has posterior probability based learning for building the user profile. In another embodiment, the AI manager includes a user profile database 230 which stores the user profiles for future use.

In the server 104, the list of URLs 232 is a category based list of URLs. From the list of URLs 232, text is extracted by using a pre-defined extractor mechanism to train the classifier 238. The selenium extractor 234 is configured to extract the dynamic and static page contents. The pre-processing operation 236 removes the noise from data, for example, script, html tags, and the like, and generates a pre-processed data. The classifier 238 includes a classification technique to train the model from the pre-processed data and generate the model. In an embodiment, the classification technique includes a supervision learning technique and other similar technique. In one embodiment, the trained model is converted into a pre-trained classifier model 240 for deploying from the electronic device for inferencing.

Figure 3:
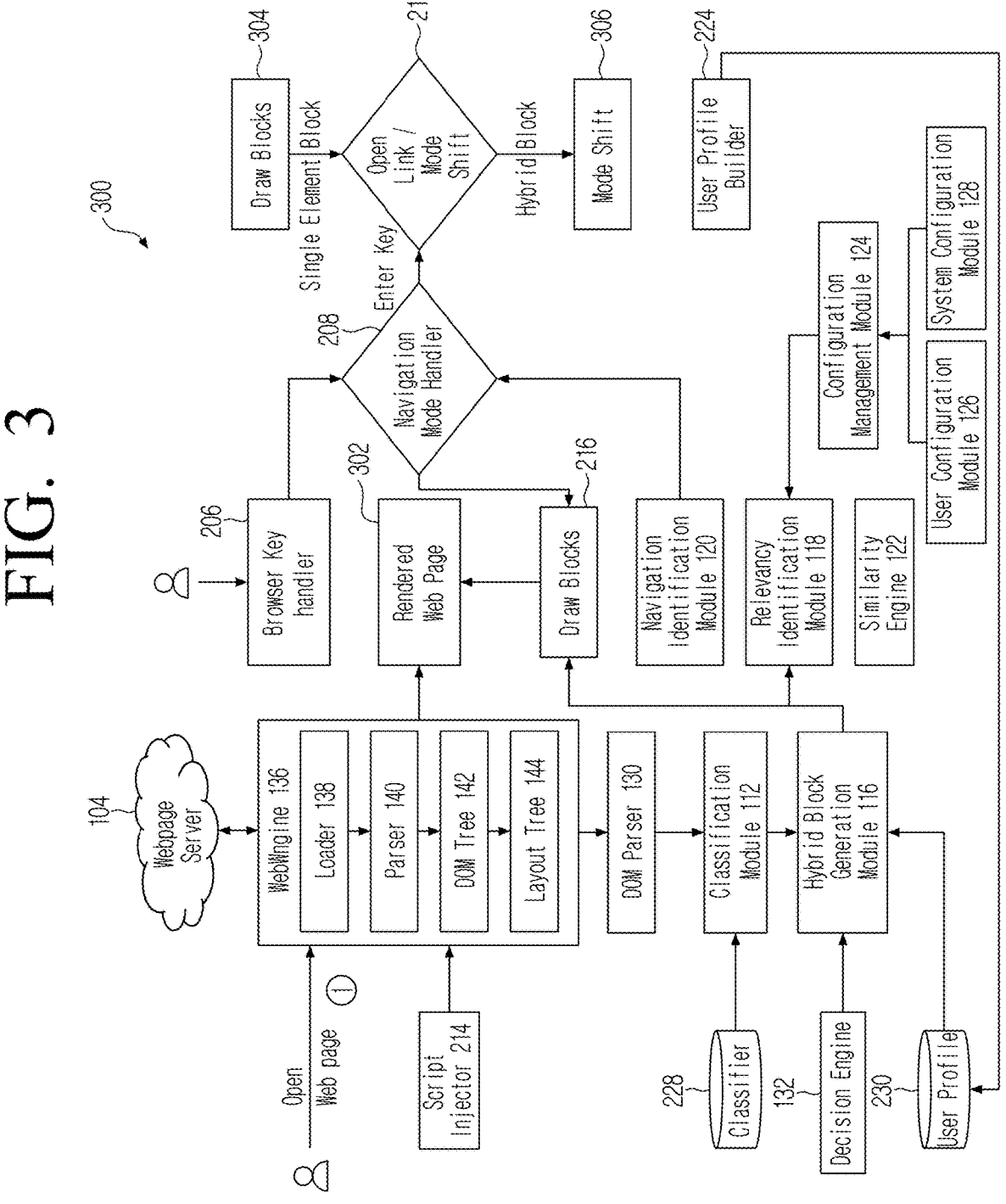
FIG. 3 is a block diagram depicting various modules of the system of FIG. 1, according to an embodiment of the disclosure.

FIG. 3 is a block diagram 300 depicting various modules of the system 100 of FIG. 1, according to an embodiment of the disclosure.

In an embodiment, a user requests to the web engine 136 to open a web page. In an embodiment, the web page is a display page, which can be opened with a browser user interface (UI) or in a UI less browser. The web engine 136 internally calls to a web engine API to load the web page. The loader 138 is configured to load the web page by calling various network calls. The parser 140 is configured to parse the web page. In an embodiment, the parser 140 includes a stack based function which performs parsing of the web page. The parser 140 is configured to extract an HTML element, text to html element, and dependent element and/or resources. Basically, the parser 140 identifies the main resources and sub-resources of the web page. The main resources include a main page of the web page, and the sub-resources include script, CSS, images and based on nature of the web page, the parser 140 requests the loader 138 once again to load the sub-resources, and meanwhile the parser 140 will continue to parse the web page to create the DOM tree. Additionally, if any web page mismatch of closing of the DOM element it closes also. The DOM tree generator 142 generates a DOM tree. The parser 140 requests the DOM tree generator 142 to build the DOM tree. The DOM tree maintains a parent child relationship between the HTML elements and provides various API for uses, for example, HTMLElement. Similarly, childNodes is provided to get a parent node of a requested node, get inner Text of requested node, and the like. The layout tree generator 144 is configured to generate a layout tree. In an embodiment, after the DOM tree creation, the layout tree is created, and CSS style properties are getting applied on every DOM element. Using the CSS style, the system 100 gets information about location of every viewable element on the display unit 102.

The script injector 214 is configured to inject a script to the web engine 136. In an embodiment, during the web page parsing DOM and layout creation is in progress, the user can instruct to the system 100 to start hybrid navigation or can wait for finishing loading of the web page. The system 100 does not have control on the user's rule and instructions; therefore, the system 100 injects the script to the web engine 136. For example,

```
webengine.executeScript(
    "var initialNode = new TreeNode(document.body);
    tree.add(initialNode);
    extractNodesFromDom(tree);
    extractCatNodes(tree);"
    )
```

In an embodiment, the DOM parser 130 is configured to parse the displayed/web page using a DOM to identify navigable elements. In an embodiment, a user provides an instruction to the system 100 to initiate hybrid navigation. The system 100 extracts the DOM nodes and parse the DOM nodes based on a user configuration rule to create the hybrid navigation. If user has not provided the user configuration rule, a default configuration will opt by the system 100 for hybrid navigation. In an embodiment, this can be a size of element, which includes a number of child nodes, and the like.

A rendered web page 302 is an actual display page. The system 100 provides the rendered web page 302 which is a lookup page and display on the web browser. The rendered web page 302 includes content that has to be displayed and paint on the display unit 102. The rendered web page 302 provides visibility of the content based on a web page developer logic.

The classification module 112 internally calls the classifier 114 to classify the content. In an embodiment, the classifier 114 includes the pre-trained model on the electronic device for performing inferencing. A primary responsibility of the classification module 112 is to get the content from the web engine 136 and instruct the classifier 228 to classify the navigable elements based on at least one category.

```
catList[ ]=classifier.classify(htmlelement.innerText)
```

In an embodiment, the classifier 228 includes a list of categories which includes possible categories of the navigable elements in a sorted order, i.e., a probable category at top (0th index), and it compares with a page given category of element with respect to a section of the page. The content resides in the section of the page and a BreadcrumbList. Thereafter, a respective schema is extracted from an attribute type itemType under which itemscope is defined. In an embodiment, both are the attributes of HTML tags. An example of BreadcrumbList is as follows:

```
<ul itemtype="https://schema.org/BreadcrumbList">
    <li itemscope="" itemtype="https://schema.org/ListItem"
    itemprop="itemListElement">
    <span itemprop="name">News</span>
    </li>
    .....
    </ul>
```

Figure 6A:
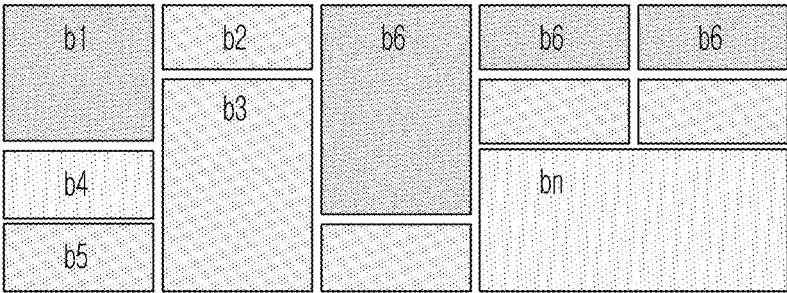
FIG. 6A is a schematic diagram depicting a hybrid block, according to an embodiment of the disclosure.

The hybrid block generation module 116 is configured to generate one or more hybrid blocks. In an embodiment, the hybrid block generation module 116 is based on decision tree algorithms and methods and finds a best rule for navigation on the generated hybrid blocks. In one embodiment, the hybrid navigation is performed on the hybrid block generation module 116 and will jump from one hybrid block to other blocks. To achieve the same following parameters is observed. FIG. 6A is a schematic diagram depicting a hybrid block 600*a*, according to an embodiment of the disclosure. In FIG. 6A, overlapping of the hybrid blocks (b1, b2, b3, b4, b5, . . . bn) takes place. In this, web page visualization with hybrid blocks is shown in colored blocks. For example, b2 has a highest edging and b3 will always be selected. In an embodiment, the hybrid block generation module 116 also depends on the decision engine 132 and the user profile 230.

Figure 5:
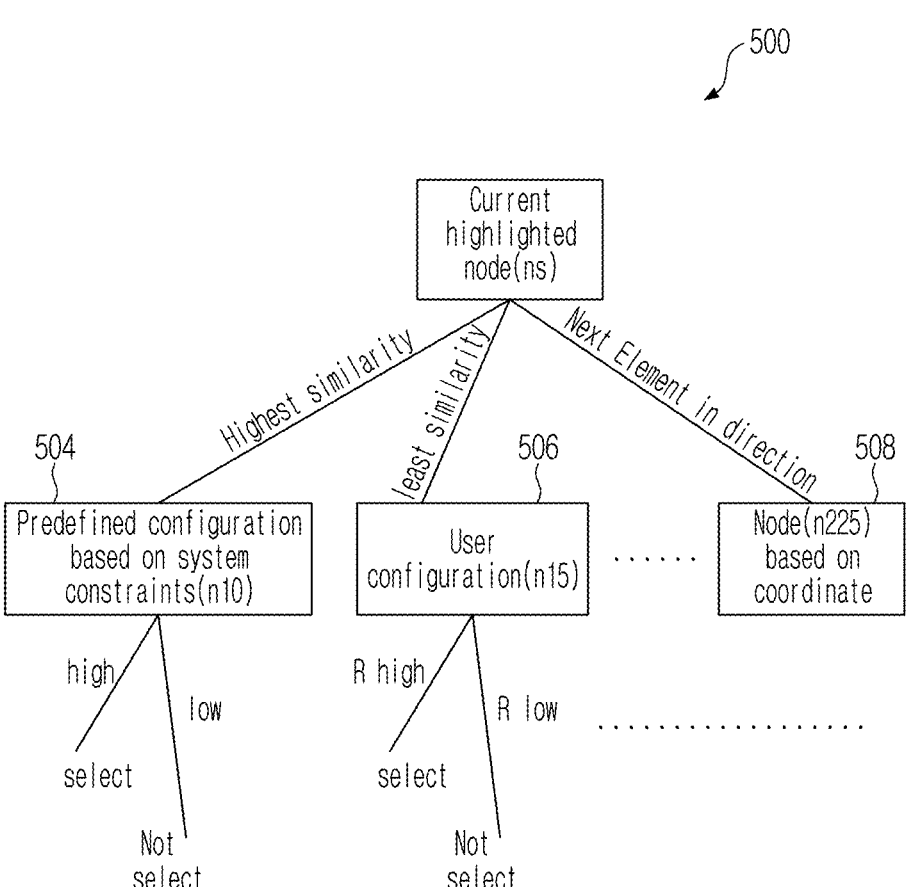
FIG. 5 is a graphical representation depicting generation of a decision tree by a decision engine, according to an embodiment of the disclosure.

In an embodiment, a (decision tree based) decision engine 132 will take the default system configuration navigation based on the device capacity and user based navigation configuration to take the decision of navigation in a direction of required navigation. This means, the decision engine 132 will create all possible direction navigation rules. FIG. 5 is a graphical representation 500 depicting generation of a decision tree by a decision engine, according to an embodiment of the disclosure. The decision engine 132 provides decision based on disjunction of conjunction of constraints.

```
Skip Ads(True)=(Rule==Skip ads)^(hybrid
    block==ads)V(Rule==skip ads)^(hybrid
    block==club ads with non ads block)
```

In FIG. 5, suppose a current node is highlighted as ns, as shown at a block 502. The decision engine 132 is configured to generate navigation rules based on predefined configuration 504, user configuration (n15) 506, and nodes (n225) based on coordinates 508. In an embodiment, the predefined configuration is based on the system constraints (n10) 504. In an embodiment, if the hybrid blocks are having highest priority, the decision engine 132 uses the predefined configuration 504 based on the system constraints, which has further high and low probabilities based on the system constraints and device capability. If the predefined configuration is selected, there will be a high probability, else low probability. In another embodiment, the user configuration is based on the user rules (user configuration) 506. In an embodiment, if the hybrid blocks are having least priority, the decision engine 132 uses the user configuration 506 based on a user rule, which has further high and low probabilities based on the user rule. If the user configuration is selected, there will be a high probability, else low probability. In yet another embodiment, the node is based on the coordinates 508. In an embodiment, if the current highlighted node is having a node having a next element in a direction, the decision engine 132 uses a node based on coordinate 508, which has further high and low probabilities based on node coordinates. If the node (n225) is selected, there will be a high probability, else low probability.

The similarity engine 122 is configured to compute the similarity between the hybrid blocks. In an embodiment, the similarity engine 122 uses cosine similarity to compute the similarity between the hybrid blocks. The formula of the cosine similarity is as follows:

$$similarity = \cos(\theta) = \frac{A \cdot B}{\|A\| \|B\|}$$

Figure 6B:
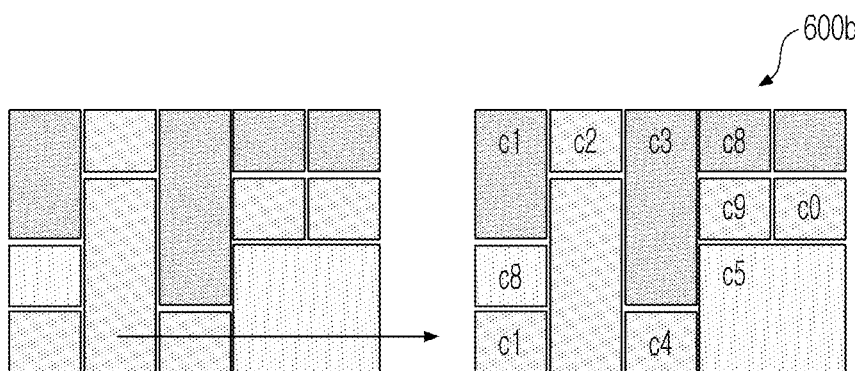
FIG. 6B is a schematic diagram depicting similarity of content of the two hybrid blocks, according to an embodiment of the disclosure.

In an embodiment, FIG. 6B is a schematic diagram 600*b* depicting similarity of content of the two hybrid blocks, according to an embodiment of the disclosure. In this, there are two hybrid blocks are shown. A block (mentioned with respect to an arrow) is selected for computing similarity of content with cl of the other hybrid blocks.

The relevancy identification module 118 is configured to create a relevance matrix. In an embodiment, based on all hybrid blocks, a content similarity check is performed, and the relevance matrix is created based on the pre-defined context parameters. The pre-defined context parameters include, content similarity, current content similarity, user profile (including interested category during the time of navigation and previous selected category), and the like. In one embodiment, the relevancy identification module 118 is configured to compute similarity of content and updated content for creating the relevance matrix. In an embodiment, the similarity of content is computed based on the logical node content similarity by using the similarity engine 122, which is listed in the direction of possible navigation. In the updated content, possible modification time can be added to the relevance matrix in the direction of navigation inverse similarity.

The navigation identification module 120 is configured to navigate to the element of interest based on the relevance matrix and the hybrid blocks. In an embodiment, the navigation identification module is configured to compute an absolute x position and width of element, absolute y and height position, Carousel calculation, Zindex, and median width and median height.

In the absolute x position and width of element, x finds how many logical column can be created on a viewport and on a page view. For example, Xij represents the x coordinate and Wij represents a respective width, then a column of any possible row can be calculated as:

$$COLij = floor(Xi1, \ldots Xin) + ceil(Xij + Wij, \ldots Xin + Win)$$

The absolute y and height position helps to create a logical row. For example, elements with Yij represents y coordinate and Hij represents a respective height, then the logical row can be calculated as:

$$ROWij = floor(Yij, \ldots) + ceil(Yij + Hij, \ldots)$$

The Carousel calculation is based on a carousel effect element placed at different locations, but the element is scrolled within a parent content. This element is bounded with a parent element as a single node.

In the Zindex calculation, the hybrid box z order is same as a highest z index of the element in the hybrid box. This is an additional navigation criterion, as the user may want to go to navigate through z-index.

In the median width (MW) and median height (MH), every web page has its own layout and different element size. For selecting an element in the logical group, width and height of the element are important factors. The navigation identification module 120 finds all element width and height of the element present in the web page and finds the MW and MH of the elements. An element is navigable node:

1: if (element Width>MW && Element Height>MH)

2: if (Element Width<MW or Element Height<MH)

2.1. Find closest sibling w.r.t. x & y.

2.2. Identify beset selection with a number of elements in logical group versus a minimum number of click needed to reach, i.e. mean cursor position (Xi, Yi)=sum (xi+wi)/n, sum (yi+hi)/n final node group=number of click min (Xi, Yi).

The configuration management module 124 is configured to generate at least one rule based on the system constraints and user configuration for navigating to the element of interest. In an embodiment, the configuration management module 124 is based on the electronic device capability and takes the best configuration using the decision engine 132. The configuration management module 124 includes the user configuration module 126, where the user can provide his/her preference of hybrid navigation for a next block selection rule, and the system configuration module 128, where the default way of hybrid navigation is based on the device capability.

The draw blocks 216 are configured to highlight the hybrid blocks. During the highlighting of the hybrid blocks, the draw block 216 places the cursor between the hybrid blocks such that all navigable elements in the hybrid blocks are on least distance from the cursor. In an embodiment, the default placement of the cursor is middle of the hybrid blocks.

The browser key handler 206 is configured to capture a remote controller key and pass the key to the navigation mode handler 208 for hybrid navigation based on a mode of the navigation.

In the open link/mode shift 210, the user can change from hybrid navigation to any other existing navigation based on his choice. After existing from the hybrid mode, the user can do normal navigation to reach to the element of interest, if the hybrid block contains more than one element. If only a single element is present, then the user can go with a click to open the element of interest.

The user profile builder 224 is configured to build the user profile based on a rule opted by the user for navigation and interested content by using Dynamic Bayesian network, i.e., posterior probability. The posterior probability can be computed as:

$$\text{Posterior probability=prior probability+new evidence}$$
$$\text{(called likelihood).}$$

Figure 7:
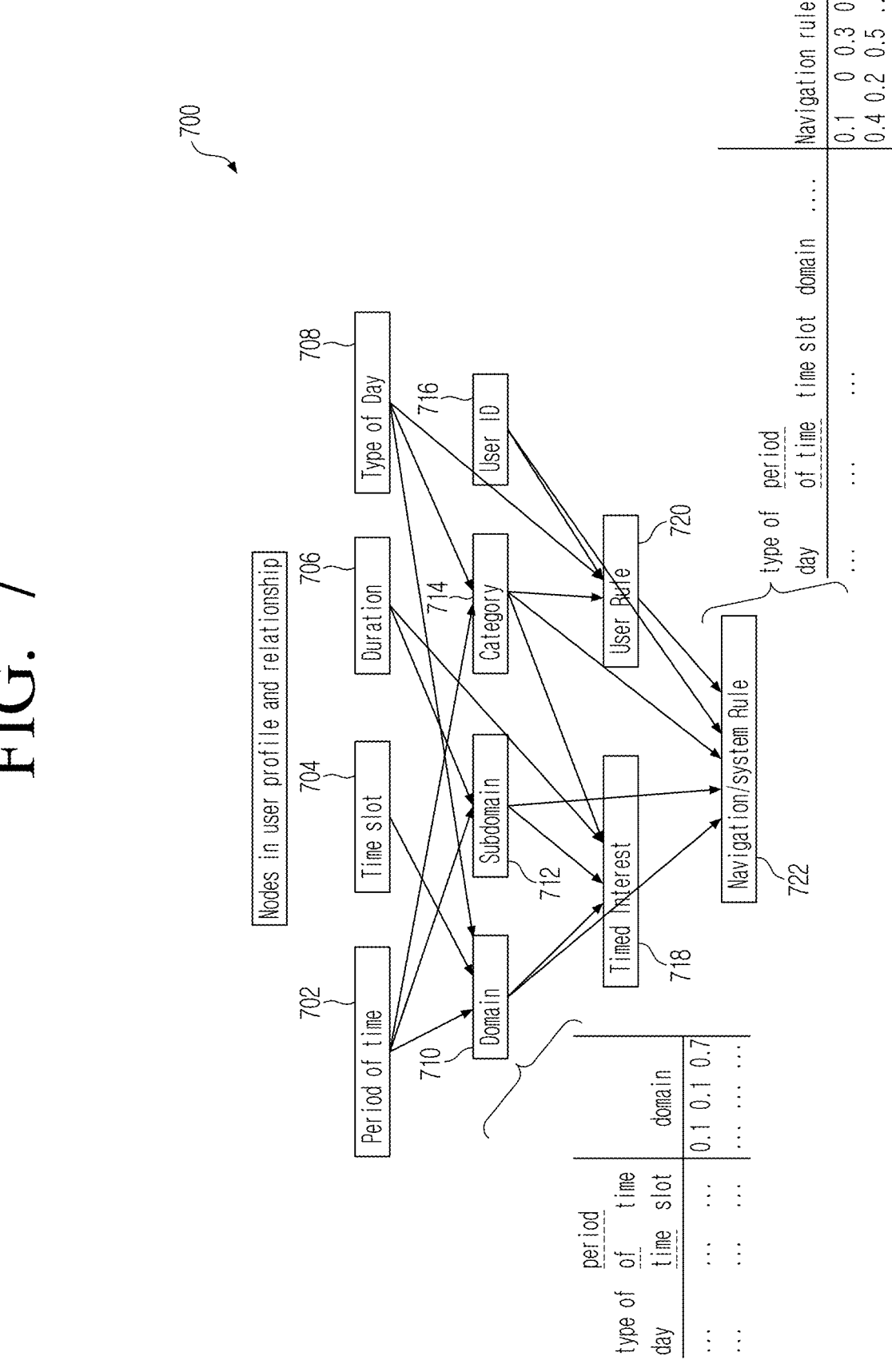
FIG. 7 is a graphical representation depicting user profile based hybrid navigation, according to an exemplary embodiment of the disclosure.

FIG. 7 is a graphical representation 700 depicting user profile based hybrid navigation, according to an embodiment of the disclosure.

In an embodiment, the user profile builder 224 is configured to build the user profile based on a rule opted by the user for navigation and interested content by using Dynamic Bayesian network, i.e., posterior probability. In an embodiment, the system 100 is configured to use a Bayesian network direct acyclic graph (DAG) for selecting the user navigation rule. For example, the formula derivation for the navigation rule selection based on the user profile is as follows.

$$P(\text{skip ads,domain,subdomain,category,user ID,timed interest,user rule})$$

$$=P(\text{user rule|duration,domain,subdomain,category, timed interest})P(\text{skip ads,user ID,domain,subdomain,category,timed interest})$$

$$=P(\text{user rule|duration,domain,subdomain,category, timed interest})P(\text{skip ads|domain,subdomain})P (\text{category|domain})p(\text{category|timed interest})$$

In FIG. 7, the nodes in the user profile and relationship includes a period of time 702, time slot 704, duration 706, and type of day 708, domain 710, sub-domain 712, category 714, user ID 716, timed interest 718, user rule 720, and navigation/system rule 722. The period of time 702 is based on the sub-node's domain 710, sub-domain 712, and a category 714. In an embodiment, the period of time 702 refers to a time period (for example, one hour, two hours, etc.) for which the user access the display unit 102 based on domain 710, sub-domain 712, and the category 714 of the content displayed on the display unit 102 of the electronic device. In another embodiment, the time slot 704 refers to a length of time allotted to accessing the display unit 102 based on the domain 710 of the content. In another embodiment, the duration 706 refers to a time during which the user accesses the display unit 102 based on the sub-domain 712 and timed interest 718. The type of day 708 refers to weekday, weekend, holidays etc., which is based on the sub-domain 712, category 714, and user rule 720. The domain 710 of the content is further based on the timed interest 718 and the navigation/system rule 722. The sub-domain 712 is based on the timed interest 718 and the navigation/system rule 722. The category of the content 714 is based on the timed interest 718, user rule 720, and navigation/system rule 722. The user ID 716 is based on the user rule 720 and the navigation/system rule 722. In an embodiment, the user ID 716 is another context and not the primary field navigation selection rule. If the field of the node user ID is not present in a timed based electronic device profile, the system 100 will considered the field as empty. In another embodiment, the system 100 is configured to generate a domain table for the node domain 710, which includes separate columns of the type of day 708, period of time 702, and time slot 704, and provides the domain 710 details. In an embodiment, the system 100 is configured to generate other tables for sub-domain 712, category 714, timed interest 718, and the user rule 720. In another embodiment, the user ID 716 might be filled or empty, and it is just a value, and the navigation rule personalization is dependent on the user ID 716. Similarly, the system 100 is configured to generate the table for the navigation/system rule 722 which includes the type of day 708, period of time 702, time slot 704, and domain 710. In one embodiment, the navigation/system rule 722 is an observed navigation rule node.

Figure 8A:
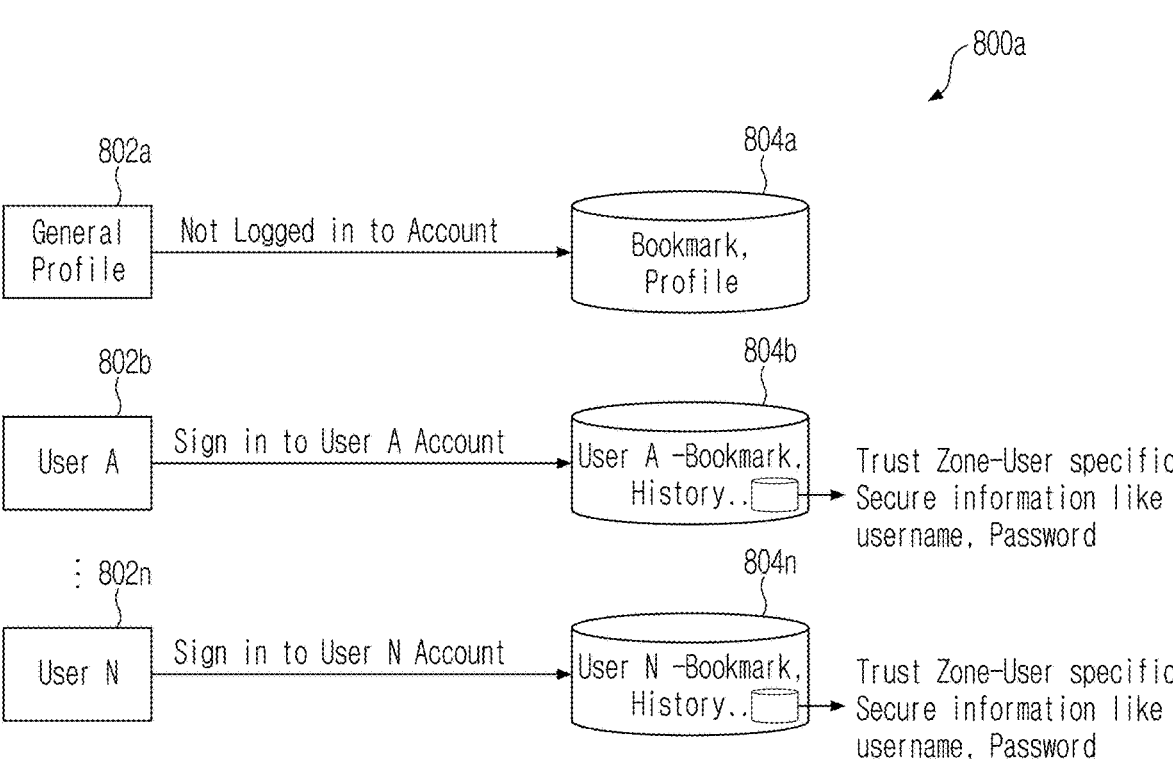
FIGS. 8A and 8B are schematic diagrams depicting a login process for the user for personalizing the browsing by using a navigation rule, according to an exemplary embodiment of the disclosure.
Figure 8B:
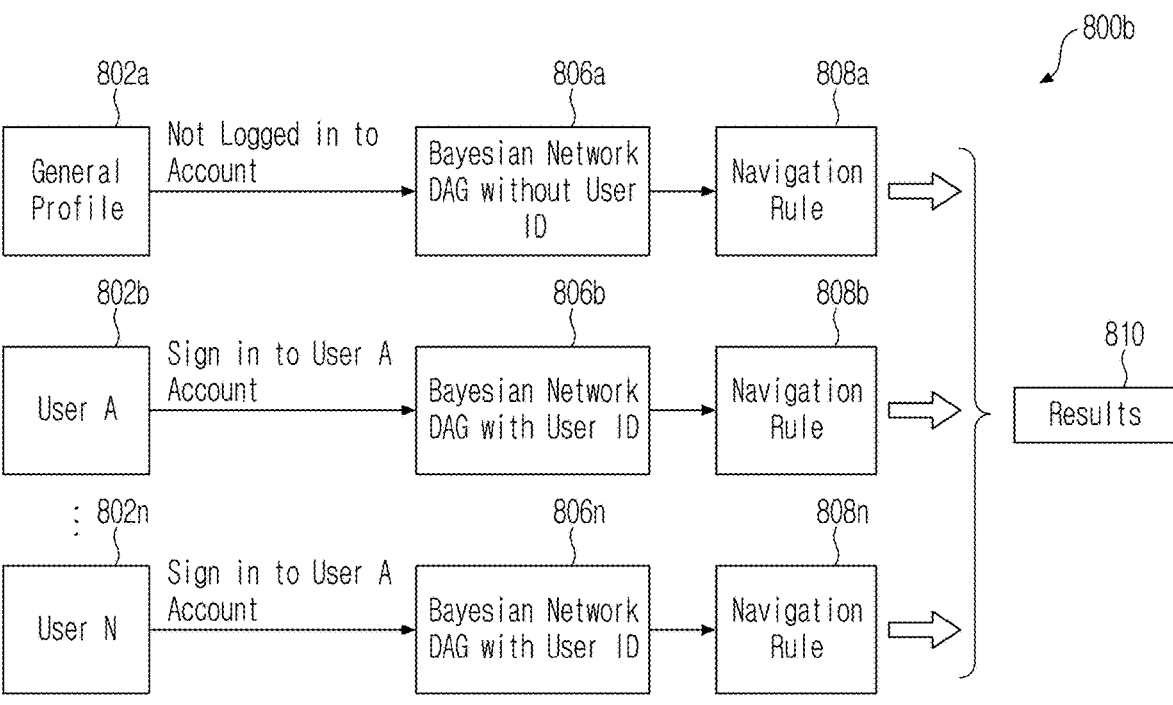

FIGS. 8A and 8B are schematic diagrams 800a and 800b depicting a login process for the user for personalizing the browsing by using a navigation rule, according to an embodiment of the disclosure.

FIG. 8A is a login process where the user can login to his account to personalize the features of bookmarks, watch later, browsing history, website login information, and the like. In an embodiment, no user personal information is shared to a third party server. All the information will be stored in a local database 804 of the electronic device. In an embodiment, the local database 804 is a database 134. There are different types of profiles, i.e., a general profile 802a and a specific profile 802b,802n for users. For example, in the general profile 802a, the user is not logged into a specific account to personalize the features, such as bookmarks, history, etc. It is already stored in a database 804a of the electronic device. Further, the user can login with his account. For example, a user A signs in his own account (i.e., User A account). The database 804*b* already stores the user's personalized features, for example bookmark, history, etc. In the database 804*b*, there is a trust zone which specifically stores user personal information, such as username, password, and the like to protect it from the data theft. Similarly, a user N signs in his own account (i.e., User N account). The database 804*n* already stores the user's personalized features, for example bookmark, history, etc. In the database 804*n*, there is a trust zone which specifically stores user personal information, such as username, password, and the like to protect it from the data theft.

In FIG. 8B, the login process is defined for both signed in and general profile. In an embodiment, if a general profile 802*a* of the user is not logged in, then the user profile builder 224 is configured to build the user profile based on a rule opted by the user for navigation and interested content by using Dynamic Bayesian network, i.e., posterior probability. In an embodiment, the system 100 is configured to use a Bayesian network direct acyclic graph (DAG) for selecting the user navigation rule 808*a* without user ID 806*a*. A result 810 is produced where there is an improvement from the link and pointer modes. In another embodiment, if the user A 802*b* signs in the account, then the user profile builder 224 is configured to build the user profile based on a rule opted by the user for navigation and interested content by using Dynamic Bayesian network, i.e., posterior probability. In an embodiment, the system 100 is configured to use a Bayesian network direct acyclic graph (DAG) for selecting the user navigation rule 808*b* with user ID 806*b*. This will be same as a number of users, where there will be an improvement from the link mode with personalization of the user A, B, . . . N.

Figure 9:
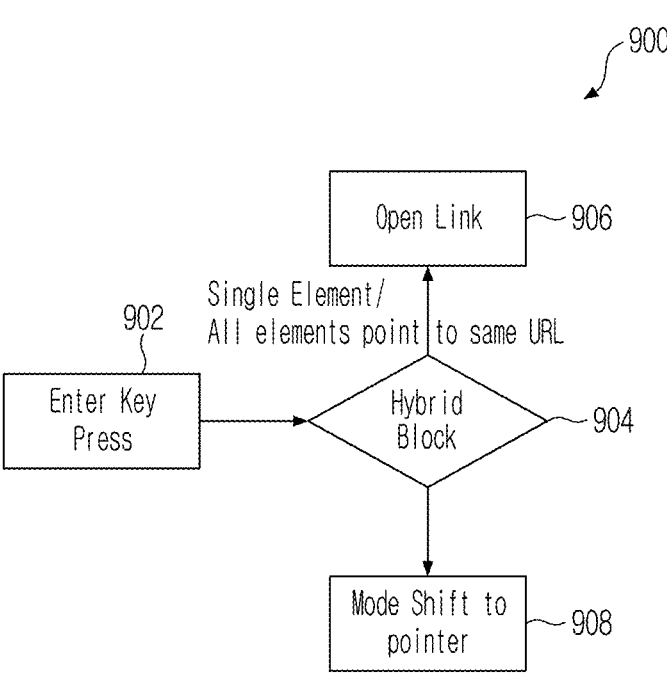
FIG. 9 is a flow diagram depicting selecting a navigable element, according to an exemplary embodiment of the disclosure.

FIG. 9 is a flow diagram 900 depicting selecting a navigable element, according to an embodiment of the disclosure.

In an embodiment, a key is configured for exit the hybrid mode, for example, an exit key, a back key, or any other key present on remote unit. A long key press is a configured key for exiting from the hybrid navigation mode. If the user is pressed on a click event, i.e., enter key, in this case, the system 100 performs the operations as mentioned in the FIG. 9. At a block 902, a user enters a key press. At block 904, the system 100 checks the hybrid blocks. At block 906, if only one element is present, then the system 100 will open a link and once a new page is open, it will start the hybrid mode of navigation for the new page. At block 908, if there are more than one navigable element, the system 100 will check if all is pointing to same URL (i.e., intended to open the same link), then the system 100 will open the new link and start hybrid navigation mode and one page is loaded. If the hybrid block has a different navigable element, in this case, the system 100 exits from the hybrid navigation and the user can do normal navigation to do selection of the element of interest as the user has reached to the hybrid block like a pointer mode.

FIG. 10 is a flow chart depicting a method 1000 for personalized browsing using a remote device, according to an embodiment of the disclosure.

At 1002, a page associated with at least one user is displayed by a display unit. In an embodiment, a display unit (display) 102 is configured to display a page associated with at least one user. At 1004, one or more navigable elements on the displayed page are identified by a an element identification module. In an embodiment, an element identification module 110 is configured to identify one or more navigable elements on the displayed page. At 1006, one or more categories of the navigable elements are created by a classification module. In an embodiment, a classification module 112 is configured to create one or more categories of the navigable elements. At 1008, the navigable elements are classified, by the classification module, based on at least one created category. In an embodiment, the classification module 112 is configured to classify the navigable elements based on at least one created category. At 1010, one or more hybrid blocks are generated, by a hybrid block generation module, based on a category of the navigable elements and user profile data. In an embodiment, a hybrid block generation module 116 is configured to generate one or more hybrid blocks based on a category of the navigable elements and user profile data. At 1012, a content similarity check between the hybrid blocks is performed by a relevancy identification module. In an embodiment, a relevancy identification module 118 is configured to perform a content similarity check between the hybrid blocks. At 1014, a relevance matrix is created, by the relevancy identification module, based on pre-defined context parameters and the similarity check. In an embodiment, the relevancy identification module 118 is configured to create a relevance matrix based on pre-defined context parameters and the similarity check. At 1016, a navigation identification module navigates to an element of interest based on the relevance matrix and the hybrid blocks. In an embodiment, a navigation identification module 120 is configured to navigate to an element of interest based on the relevance matrix and the hybrid blocks.

Figure 11:
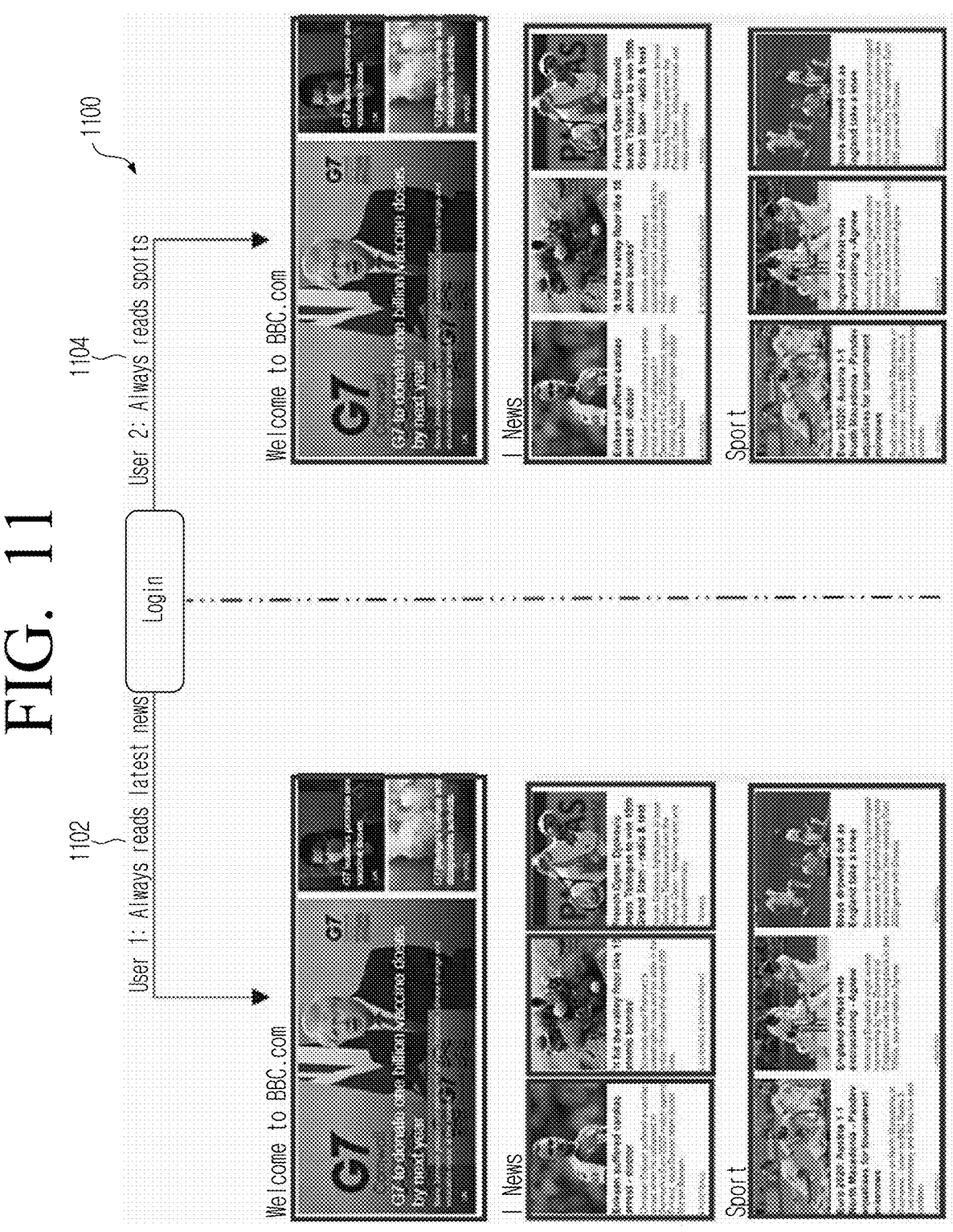
FIG. 11 is a use case scenario depicting personalized navigation for each user, according to an exemplary embodiment of the disclosure.

FIG. 11 illustrates a use case scenario 1100 depicting personalized navigation for each user, according to an embodiment of the disclosure. Suppose, a user 1 always reads latest news, as shown at 1102 after login to the electronic device. The system 100 generates the hybrid blocks based on a category of the navigable elements and user 1 profile data, and navigate to the news related element. Further, a user 2 always prefers sports, as shown at 1104. The system 100 navigates to the sports related news block.

Figure 12:
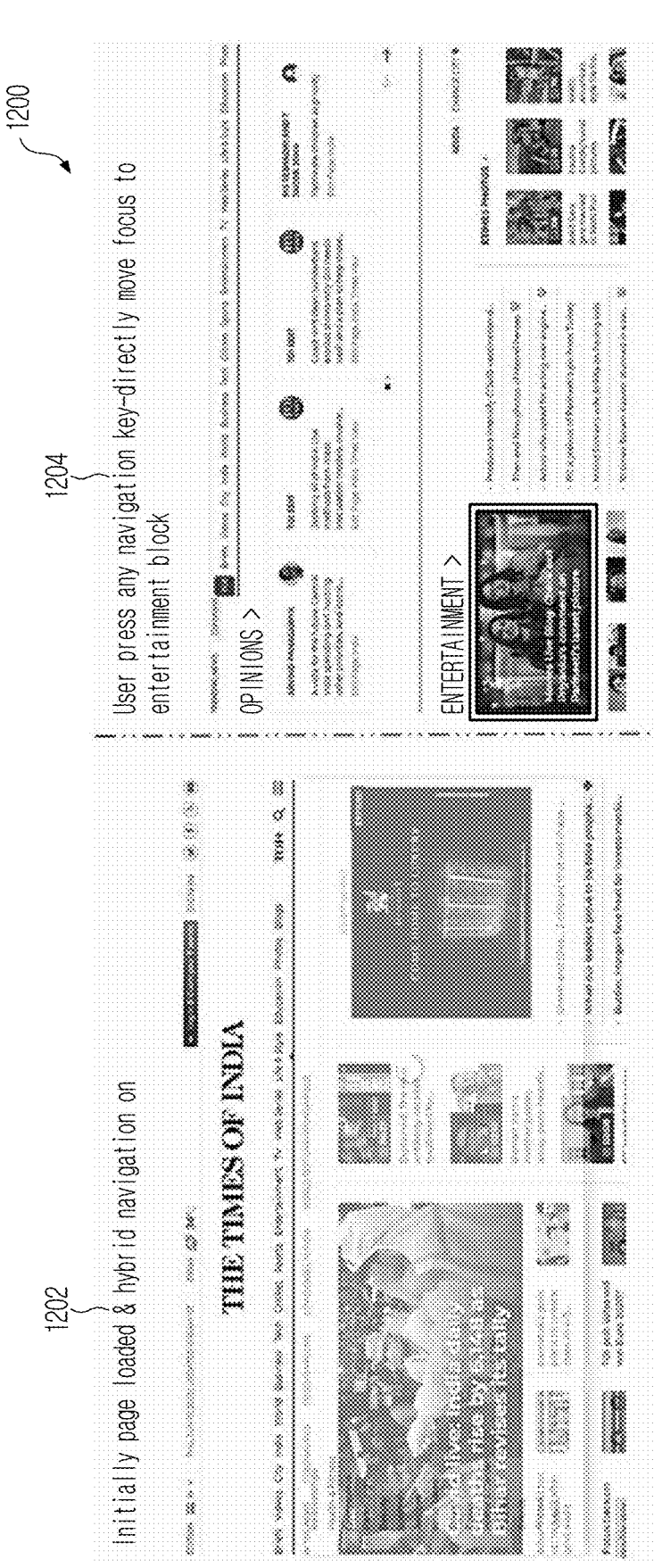
FIG. 12 illustrates a use case scenario depicting navigating an entertainment section based on a user rule, according to an exemplary embodiment of the disclosure.

FIG. 12 illustrates a use case scenario 1200 depicting navigating an entertainment section based on a user rule, according to an embodiment of the disclosure. At 1202, an initially page is loaded and hybrid navigation is started. As per a user navigation rule, the system 100 navigates to a category. Here, the user's predicted category is entertainment. Therefore, the system 100 navigates to entertainment sections on the displayed page. At 1204, a user pressed is the navigation key. The system 100 identifies the entertainment section in a current display page. The system 100 scrolls the page and highlight a first block of entertainment and further clicks move focus to only entertainment sections as shown by a rectangle highlighted box.

Figure 13:
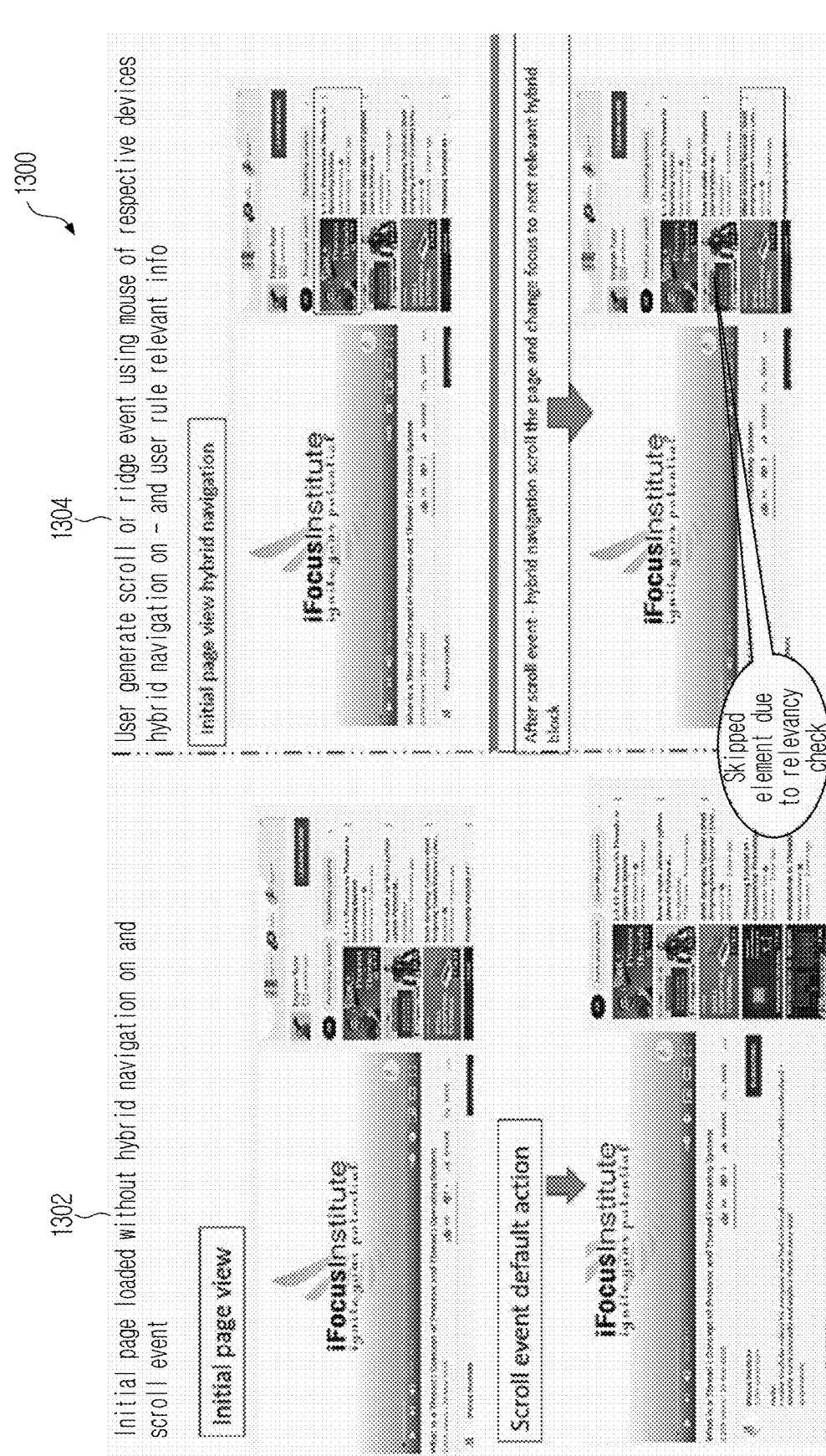
FIG. 13 illustrates a use case scenario depicting a scrolling event, according to an exemplary embodiment of the disclosure.

FIG. 13 illustrates a use case scenario 1300 depicting a scrolling event, according to an embodiment of the disclosure. At 1302, an initial page is loaded without hybrid navigation on and scroll event. At 1304, the user generates a scroll or ridge event using a pointer device of the respective devices, when the hybrid navigation is on and the user rule relevant information is obtained. In the scrolling event, the system 100 skips one or more elements dues to a relevancy check.

Figure 14:
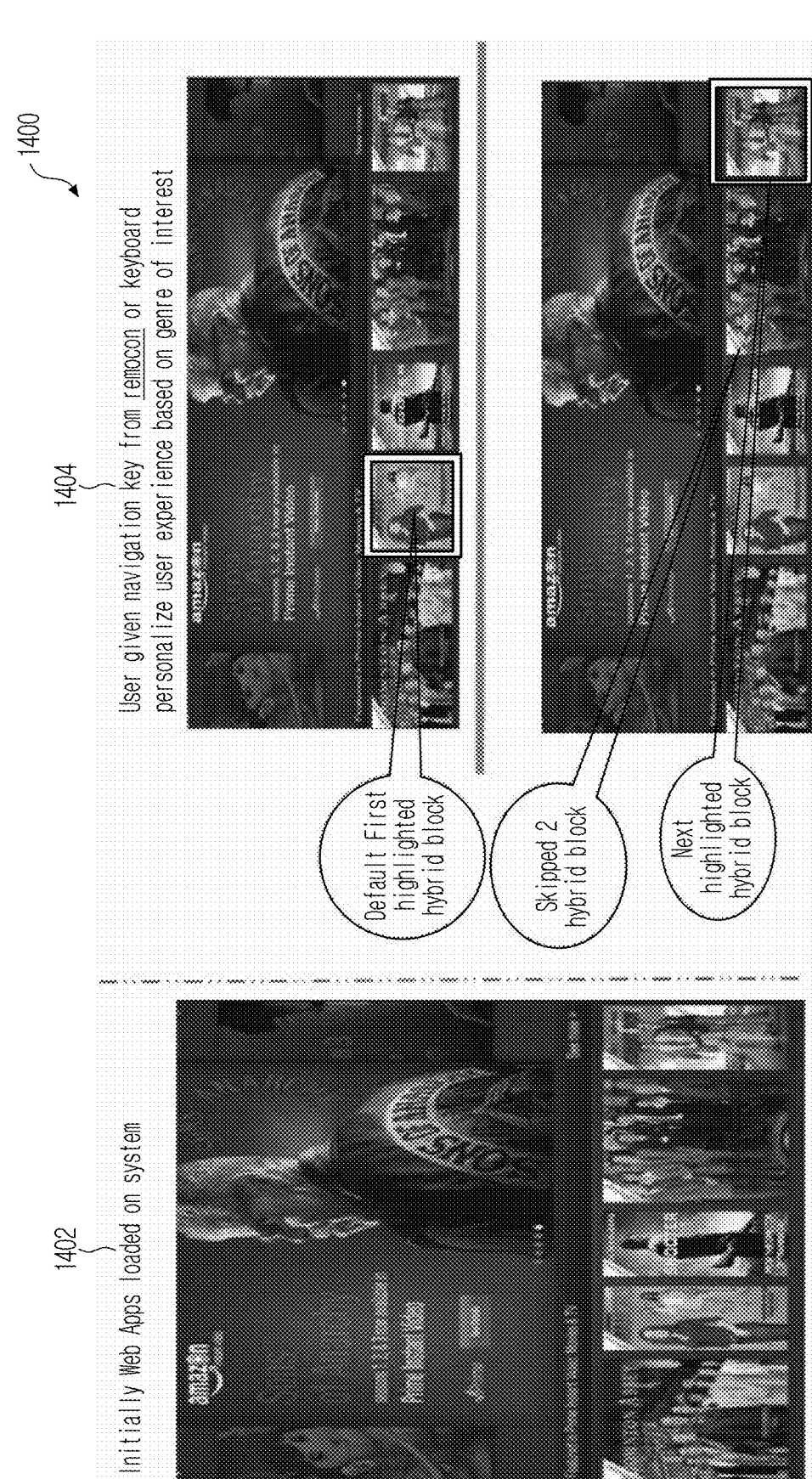
FIG. 14 illustrates a use case scenario depicting improved navigation based on user rules and learning in a web application, according to an exemplary embodiment of the disclosure.

FIG. 14 illustrates a use case scenario 1400 depicting improved navigation based on user rules and learning in a web application, according to an embodiment of the disclosure. At 1402, an initially web application is loaded on the system 100. At 1404, the system 100 captures a remote controller key and pass the key to the navigation mode handler 208 for hybrid navigation based on a mode of the navigation. In this, at a first display page default first highlighted hybrid block is shown, and on the second display page, the system 100 skips two hybrid blocks and highlight the next hybrid block based on user's element of interest.

Figure 15:
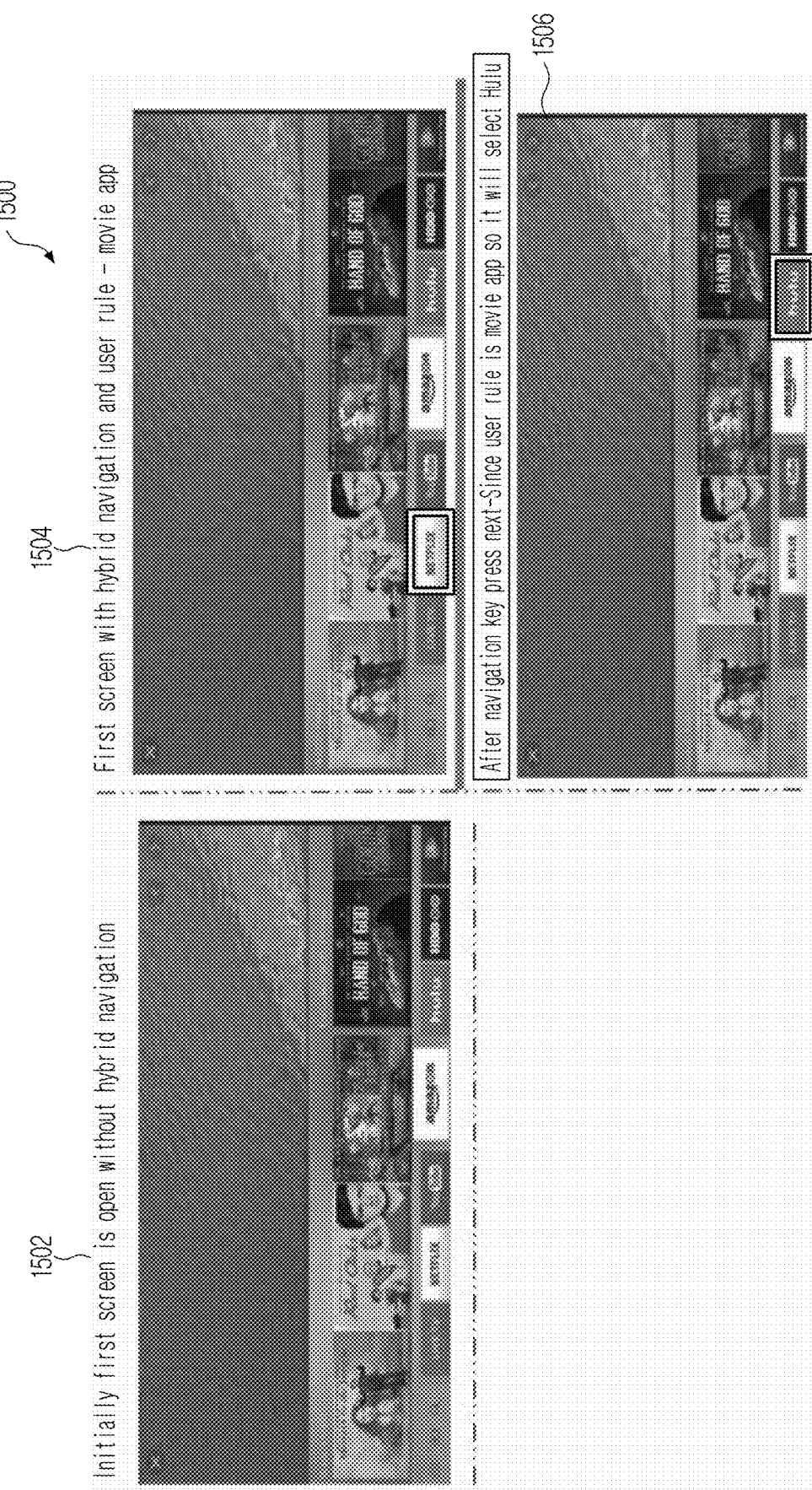
FIG. 15 illustrates a use case scenario depicting a first screen navigation policy based on a user rule, according to an exemplary embodiment of the disclosure.

FIG. 15 illustrates a use case scenario 1500 depicting a first screen navigation policy based on a user rule, according to an embodiment of the disclosure. At 1502, initially a first screen is open without hybrid navigation. At 1504, a first screen with hybrid navigation and user rule is shown. Here, the screen is shown based on a movie application, as the user rule is related to movie. At 1506, after pressing the navigation key by the user, the system 100 will directly navigate to the other movie application. In an embodiment, the system 100 loads the application navigation guide and allows a user to select the next and previous application in grid. The system 100 takes care of a user navigation rule, i.e., instead of immediate next or previous application, it may skip them and select most relevant application based on the user rules selected for hybrid navigation as shown on a right side.

Figure 16:
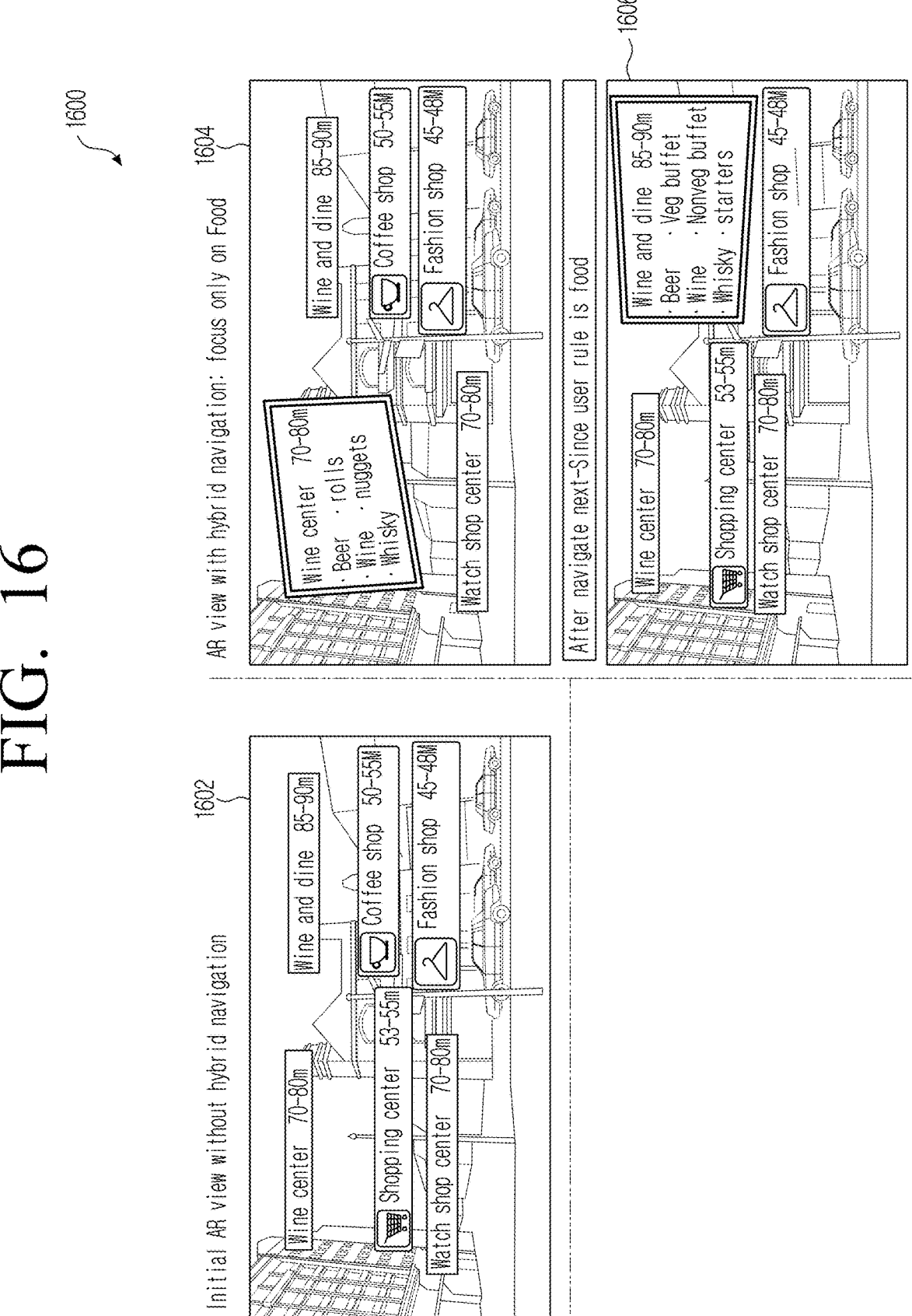
FIG. 16 illustrates a use case scenario depicting a user rule or an artificial intelligence (AI) technique based on a user selection pattern, according to an embodiment of the disclosure.

FIG. 16 illustrates a use case scenario 1600 depicting a user rule or an artificial intelligence (AI) technique based on a user selection pattern, according to an embodiment of the disclosure. At 1602, an initial augmented reality (AR) view without hybrid navigation is shown. At 1604, the AR view with hybrid navigation is shown, where the system 100 focuses on food. At 1606, the system navigates next, as the user rule is related to the food. In an embodiment, a default AR device displays all information and allows the user to navigate in grid or a respective way. The system 100 takes care of a user navigation rule, i.e., instead of default navigation, it uses the user rule and provides the options as soon on a right side.

Figure 17:
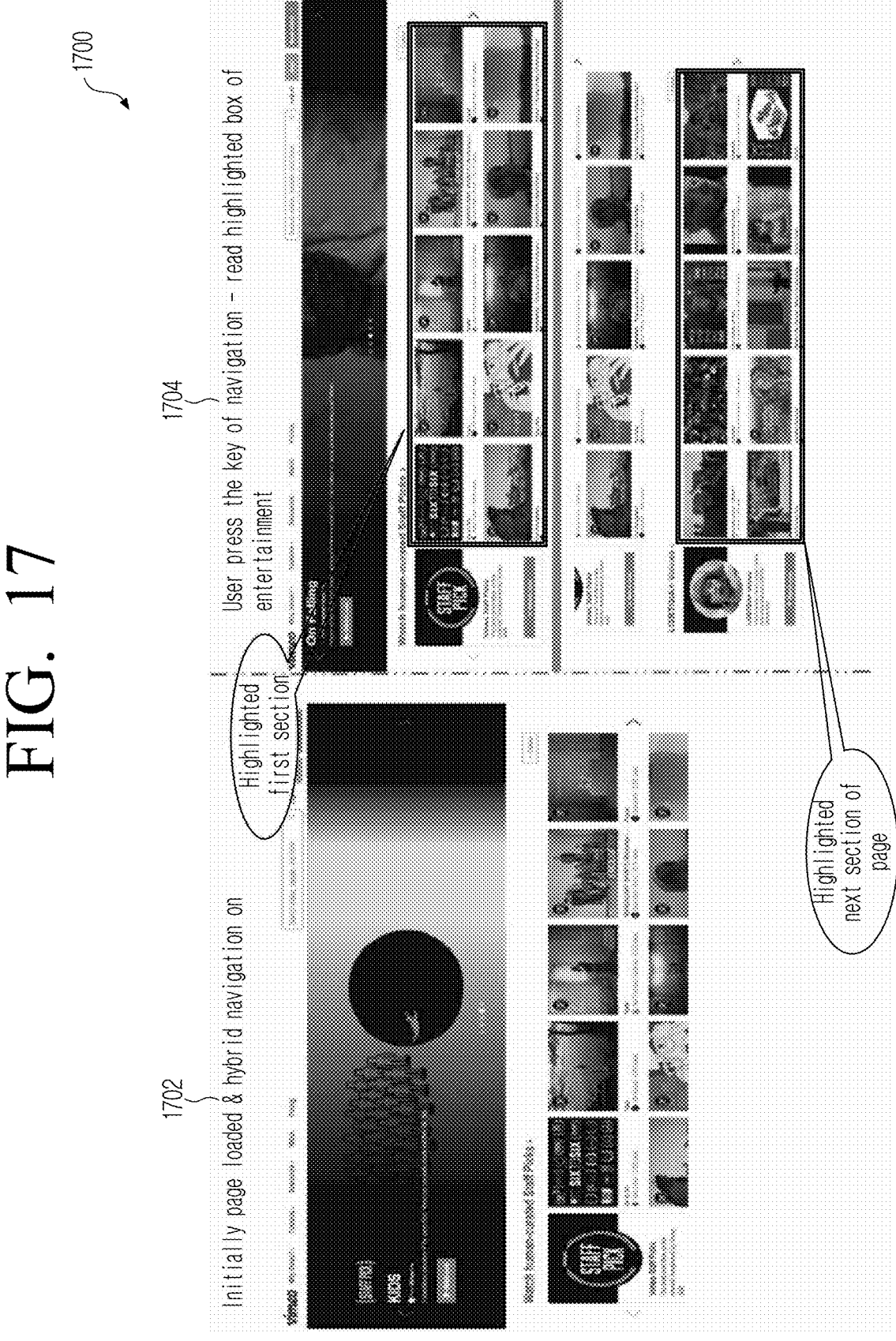
FIG. 17 illustrates a use case scenario depicting jumping over a custom section of a web page based on a user rule, according to an embodiment of the disclosure.

FIG. 17 illustrates a use case scenario 1700 depicting jumping over a custom section of a web page based on a user rule, according to an embodiment of the disclosure. At 1702, initially page is loaded, and hybrid navigation mode is on. A user opens a page which has various sections on the page. A user rule for hybrid navigation is jump over section, i.e., create the hybrid blocks of section and navigate. At 1704, a user presses a key of navigation and reads a highlighted box of the entertainment.

Figure 18:
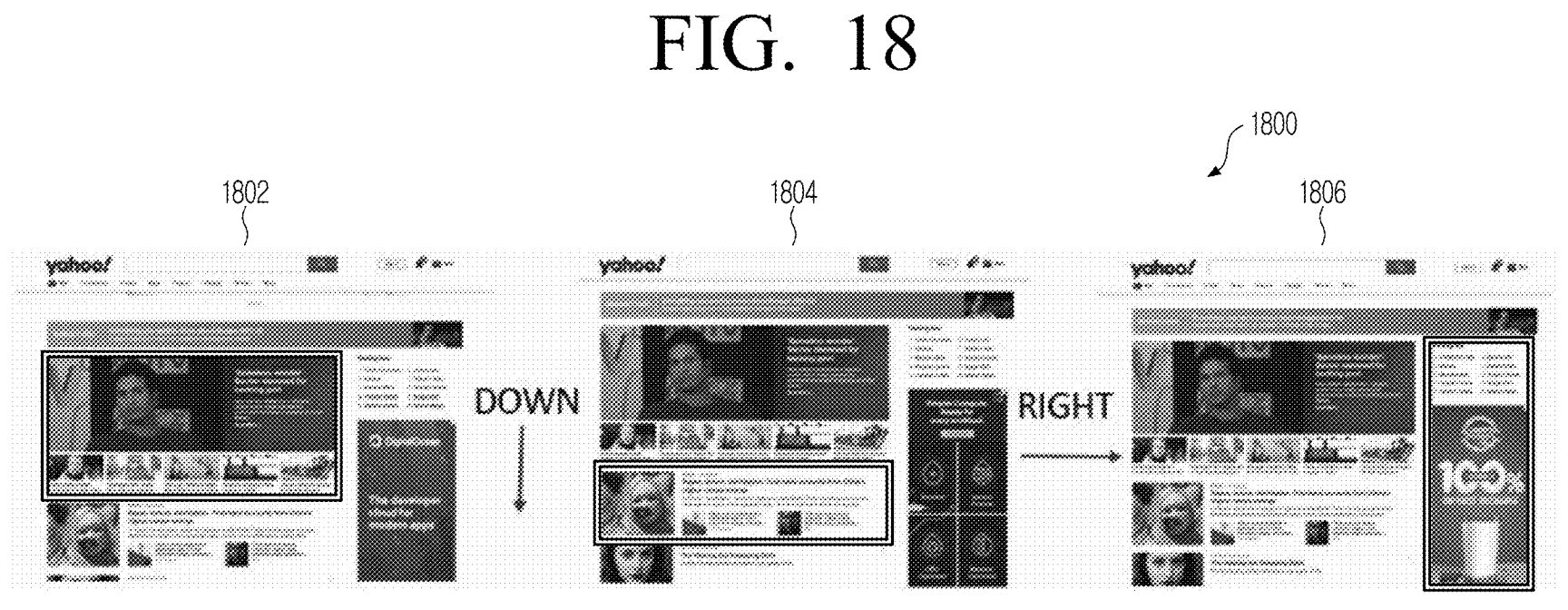

FIG. 18 illustrates a use case scenario 1800 depicting key press of a remote device for navigation, according to an embodiment of the disclosure. At 1802, a page is loaded on the display unit 102. If the user presses a navigation key (down arrow), the system 100 navigates the block down based on the system/user rule, and reaches at the element of interest, as shown at 1804. At 1806, if a user presses a navigation key right, the system 100 navigates the block in right based on the rule, and reaches at the element of interest. In one embodiment, the system 100 displays the hybrid blocks. Then, based on a down key press, the system 100 decides which is most probable hybrid block to be selected and the system 100 selects the hybrid block, accordingly. Similarly, this happens to each key presses. Here, the system 100 provides the navigation of element of interest by pressing only one click.

Figure 19:
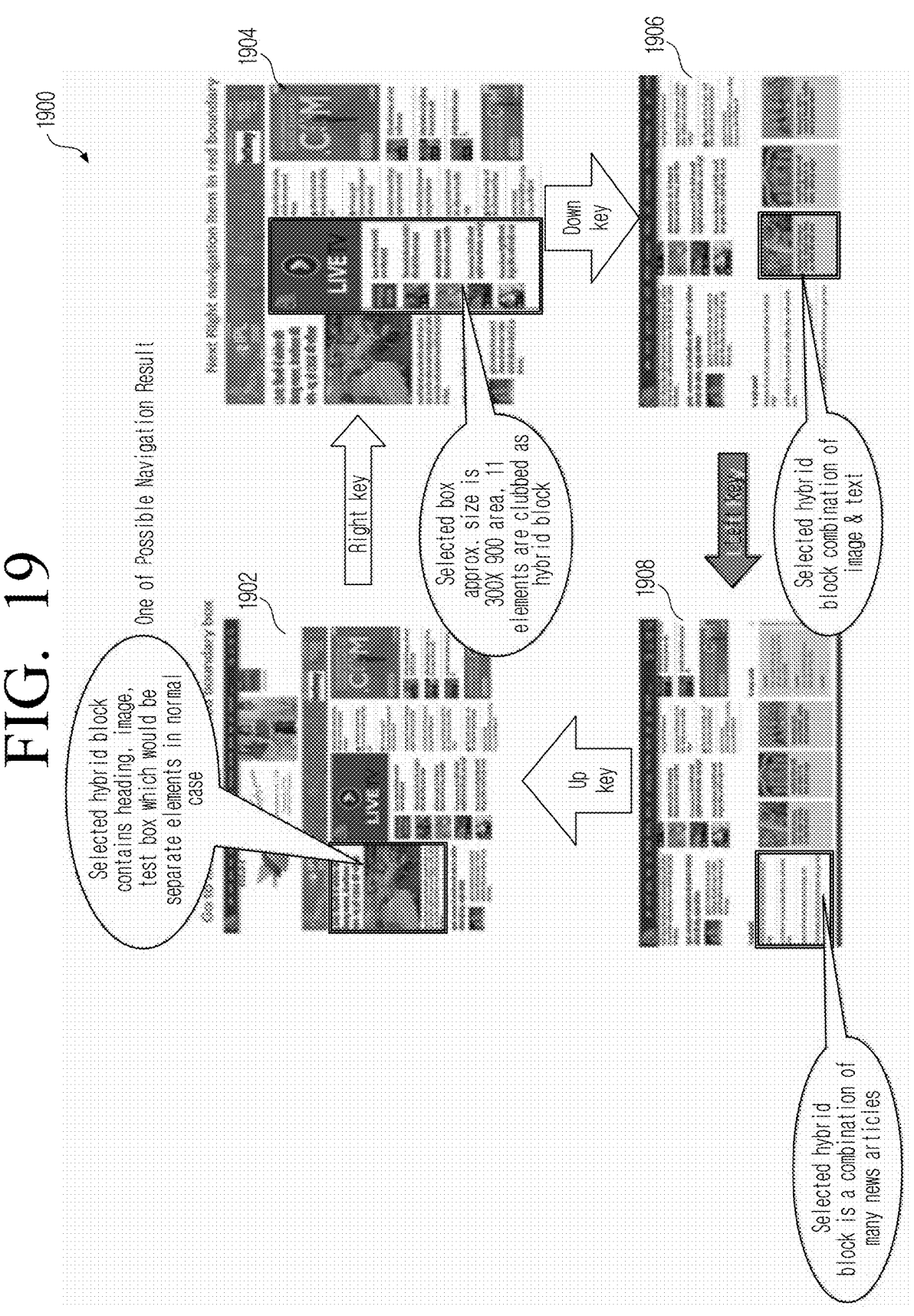
FIG. 19 illustrates a use case scenario depicting selection of a hybrid block combination of an image and text, according to an embodiment of the disclosure.

FIG. 19 illustrates a use case scenario 1900 depicting selection of a hybrid block combination of an image and text, according to an embodiment of the disclosure. At 1902, the selected hybrid block contains heading, image, text box, which would be separate in a normal case. At 1904, when the user presses a right key, the selected box approximately size is 300*900 area, 11 elements are clubbed as a hybrid block. At 1906, if a user presses a down key, a selected block combination is of image and text. At 1908, if the user presses a left key, the selected hybrid block is a combination of many news articles. If the user presses up key, the system 100 again navigates and goes to the 1902.

Figure 20:
FIG. 20 illustrates a use case scenario depicting user interface (UI) based visualization of hybrid blocks for navigation, according to an embodiment of the disclosure.

FIG. 20 illustrates a use case scenario 2000 depicting user interface (UI) based visualization of hybrid blocks for navigation, according to an embodiment of the disclosure.

Figure 21:
FIG. 21 illustrates a use case scenario depicting user interface (UI) based visualization of hybrid blocks for navigation based on a category of an element, according to an embodiment of the disclosure.

FIG. 21 illustrates a use case scenario 2100 depicting user interface (UI) based visualization of hybrid blocks for navigation based on a category of an element, according to an embodiment of the disclosure.

Figure 22:
FIG. 22 illustrates a use case scenario depicting user interface (UI) based visualization of hybrid blocks for navigation based on a random category of an element, according to an embodiment of the disclosure.

FIG. 22 illustrates a use case scenario 2200 depicting user interface (UI) based visualization of hybrid blocks for navigation based on a random category of an element, according to an embodiment of the disclosure.

It should be noted that the description merely illustrates the principles of the disclosure. It will thus be appreciated that those skilled in the art will be able to devise various arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor(s) to furthering the art and are to be construed as being without limitation to such specifically recited examples and conditions. Moreover, all statements herein reciting principles, aspects, and embodiments of the disclosure, as well as specific examples thereof, are intended to encompass equivalents thereof

What is claimed is:

1. A method for personalized browsing using a remote device, the method comprising:

displaying a page associated with at least one user;

identifying one or more navigable elements on the displayed page;

creating one or more categories of the one or more navigable elements;

classifying the one or more navigable elements based on at least one category of the one or more categories;

generating hybrid blocks based on a category of the one or more navigable elements and user profile data;

performing a content similarity check between the hybrid blocks and computing an output from the performed content similarity check;

obtaining pre-defined context parameters;

creating a relevance matrix by computing similarity of content and updated content based on the pre-defined context parameters and the output from the performed content similarity check;

locating an element of interest on the page; and performing a first navigation to the element of interest by computing an absolute horizontal (x) position and a width of the element of interest, an absolute vertical (y) and a height position, a carousel effect, a z-index of the element of interest, and a median width and a median height of one or more navigable elements, based on the relevance matrix and the hybrid blocks.

2. The method of claim 1, further comprising determining a similarity of content between the hybrid blocks.

3. The method of claim 2, wherein the performing the first navigation to the element of interest based on the relevance matrix and the hybrid blocks comprises navigating to the element of interest based on the relevance matrix, the user profile data, and the similarity of content of the hybrid blocks.

4. The method of claim 1, further comprising storing, in a database, the user profile data and the pre-defined context parameters.

5. The method of claim 1, further comprising classifying the one or more navigable elements by using an artificial intelligence (AI) technique and a pre-trained model.

6. The method of claim 5, further comprising performing, using the pre-trained model, inferencing with a display.

7. The method of claim 1, wherein the user profile data comprises web access data having a period of time, a time slot, a duration, a type of day, a domain, a sub-domain, a category of a website, a user identification number, timed interest, and a user rule.

8. The method of claim 1, wherein the pre-defined context parameters comprise a content similarity, a user interest during a time of the first navigation, and a previously selected category by the at least one user.

9. The method of claim 1, further comprising parsing the displayed page by using a document object model (DOM) for identifying the one or more navigable elements.

10. The method of claim 1, further comprising generating at least one rule based on system constraints and a user configuration for the first navigation to the element of interest.

11. The method of claim 10, further comprising:
receiving a user preference for a second navigation of the hybrid blocks; and
determining a device capability for the second navigation of the hybrid blocks.

12. The method of claim 10, further comprising:
creating a plurality of direction navigation rules based on the system constraints and the user configuration; and
deciding a direction navigation from the plurality of direction navigation rules.

13. A system for personalized browsing using a remote device, the system comprising:

a display configured to display a page associated with at least one user; and
one or more processors operatively connected to the display,
wherein the one or more processors is configured to:
identify one or more navigable elements on the displayed page;
create one or more categories of the one or more navigable elements;
classify the one or more navigable elements based on at least one category of the one or more categories;
generate hybrid blocks based on a category of the one or more navigable elements and user profile data;
perform a content similarity check between the hybrid blocks and
computing an output from the performed content similarity check;
obtain pre-defined context parameters;
create a relevance matrix by computing similarity of content and updated content based on the pre-defined context parameters and the output from the performed content similarity check;
locate an element of interest on the page; and
perform a first navigation to the element of interest by computing an absolute horizontal (x) position and a width of the element of interest, an absolute vertical (y) and a height position, a carousel effect, a z-index of the element of interest, and a median width and a median height of one or more navigable elements, based on the relevance matrix and the hybrid blocks.

* * * * *